US006345360B1

(12) United States Patent
Kamada et al.

(10) Patent No.: US 6,345,360 B1
(45) Date of Patent: Feb. 5, 2002

(54) APPARATUS METHOD AND COMPUTER READABLE STORAGE MEDIUM WITH RECORDED PROGRAM FOR MANAGING FILES WITH ALTERATION PREVENTING/ DETECTING FUNCTIONS

(75) Inventors: Jun Kamada; Yasutsugu Kuroda; Etsuo Ono, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/084,955

(22) Filed: May 28, 1998

(30) Foreign Application Priority Data

Nov. 14, 1997 (JP) .............................. 9-314017

(51) Int. Cl.[7] .............................................. G06F 11/00
(52) U.S. Cl. ...................................... 713/200; 713/193
(58) Field of Search ............................... 713/200, 189, 713/193, 165, 169, 171; 326/8; 340/825.31; 380/3; 710/36

(56) References Cited

U.S. PATENT DOCUMENTS

| 4,633,391 A | * 12/1986 | Rundell ......................... 707/7 |
| 5,050,212 A | 9/1991 | Dyson |
| 5,272,754 A | * 12/1993 | Boerbert ....................... 380/25 |
| 5,479,509 A | 12/1995 | Ugon |
| 5,555,303 A | 9/1996 | Stambler |
| 5,610,980 A | 3/1997 | Johnson et al. |
| 5,619,571 A | 4/1997 | Sandstrom et al. |
| 5,764,887 A | * 6/1998 | Kells et al. .................. 395/186 |
| 5,825,875 A | * 10/1998 | Ugon ............................ 380/4 |
| 5,940,507 A | * 8/1999 | Cane ........................... 713/165 |
| 6,047,242 A | * 4/2000 | Benson ......................... 702/35 |
| 6,070,243 A | * 5/2000 | See et al. .................... 713/201 |
| 6,073,236 A | * 6/2000 | Kusakabe et al. ........... 713/169 |
| 6,167,516 A | * 12/2000 | Camion ....................... 713/168 |
| 6,209,099 B1 | * 3/2001 | Saunders ..................... 713/200 |

FOREIGN PATENT DOCUMENTS

| EP | 0 281 225 | 9/1988 |
| GB | 1588147 | 4/1981 |
| WO | 95/16947 | 6/1995 |
| WO | 96/25700 | 8/1996 |

OTHER PUBLICATIONS

Uk Search Report dated Feb. 15. 1999.

* cited by examiner

Primary Examiner—Robert Beausoleil
Assistant Examiner—Bryce P Bonzo
(74) Attorney, Agent, or Firm—Staas & Halsey LLP

(57) ABSTRACT

By storing an authenticator created from a data file in a secure area usually unaccessible, the alteration of the data file can be detected. Furthermore, by designating the data file as a main-file and creating authenticators from various kinds of sub-files related to the main-file, the size of the secure area where the authenticators are stored, can be reduced.

12 Claims, 31 Drawing Sheets

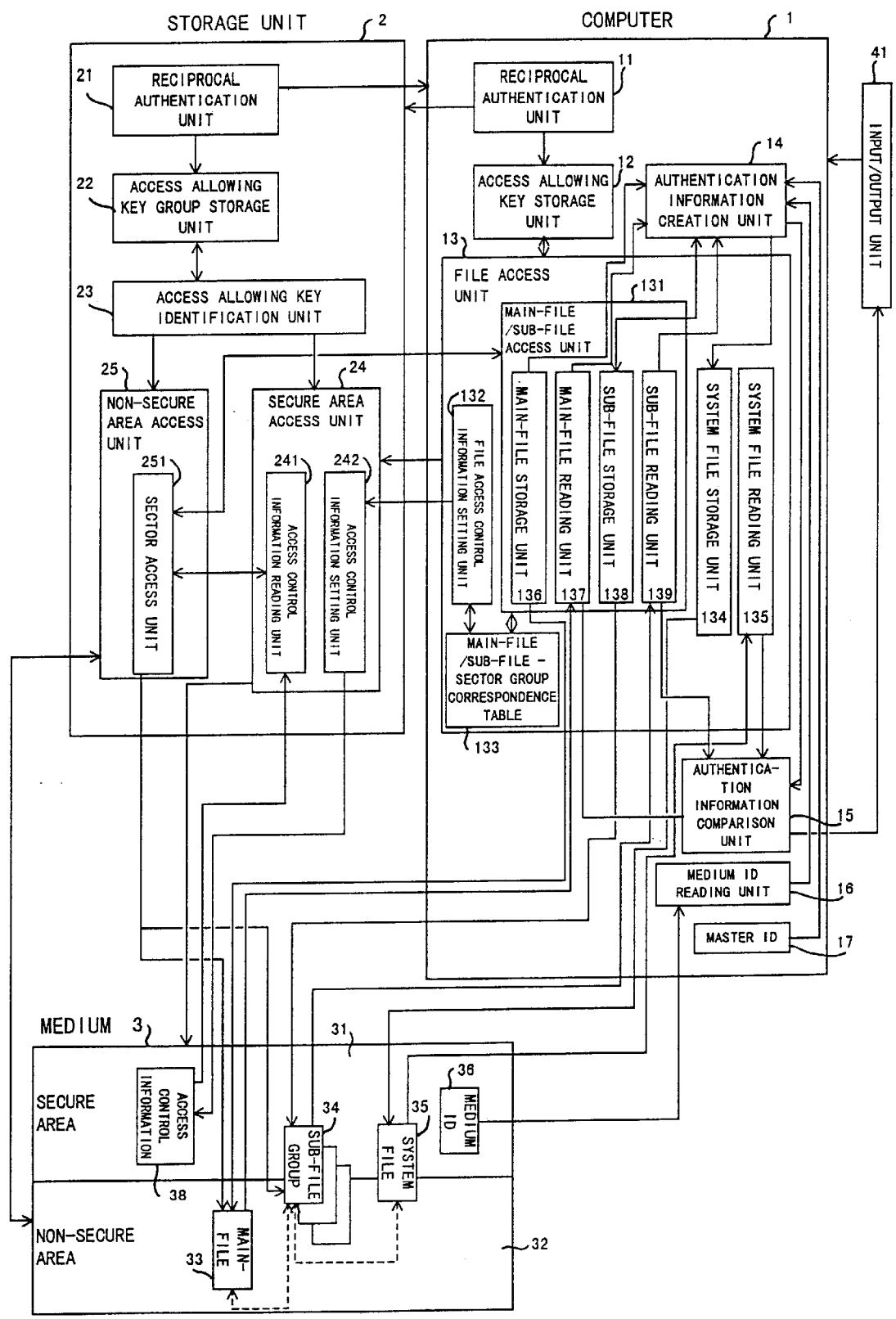
F I G. 1

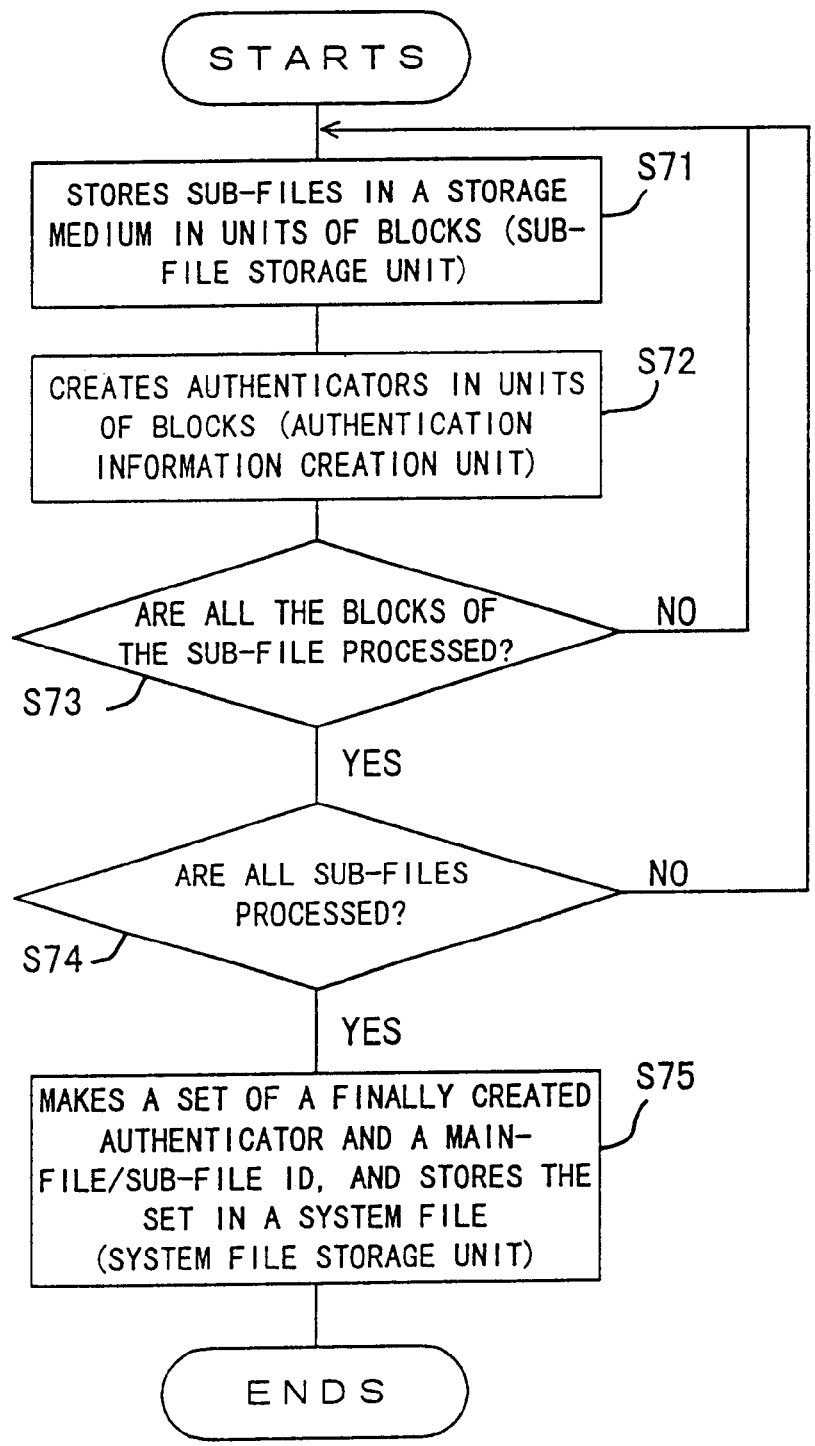
F I G.   7

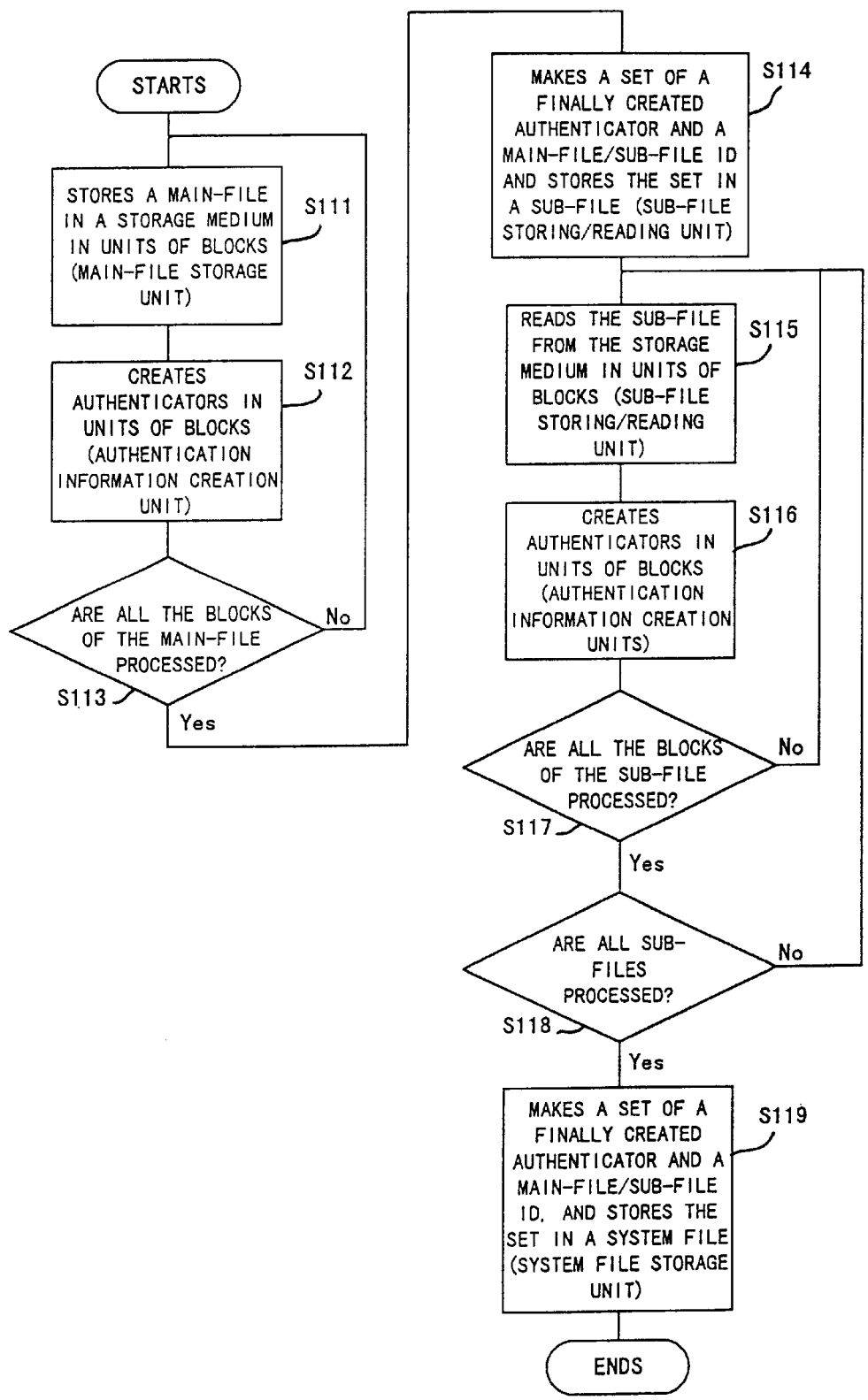
F I G. 1 1

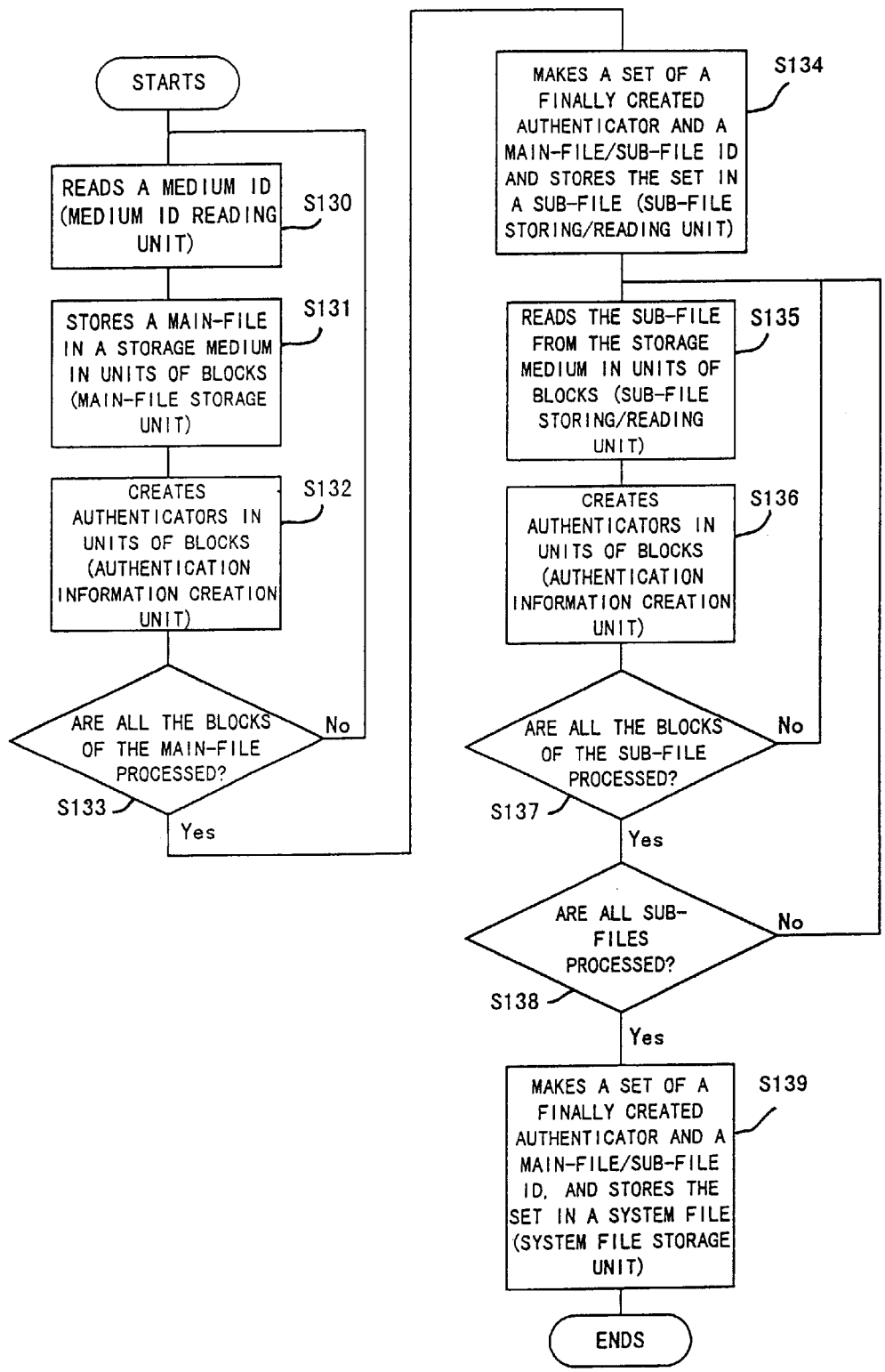
F I G. 1 3

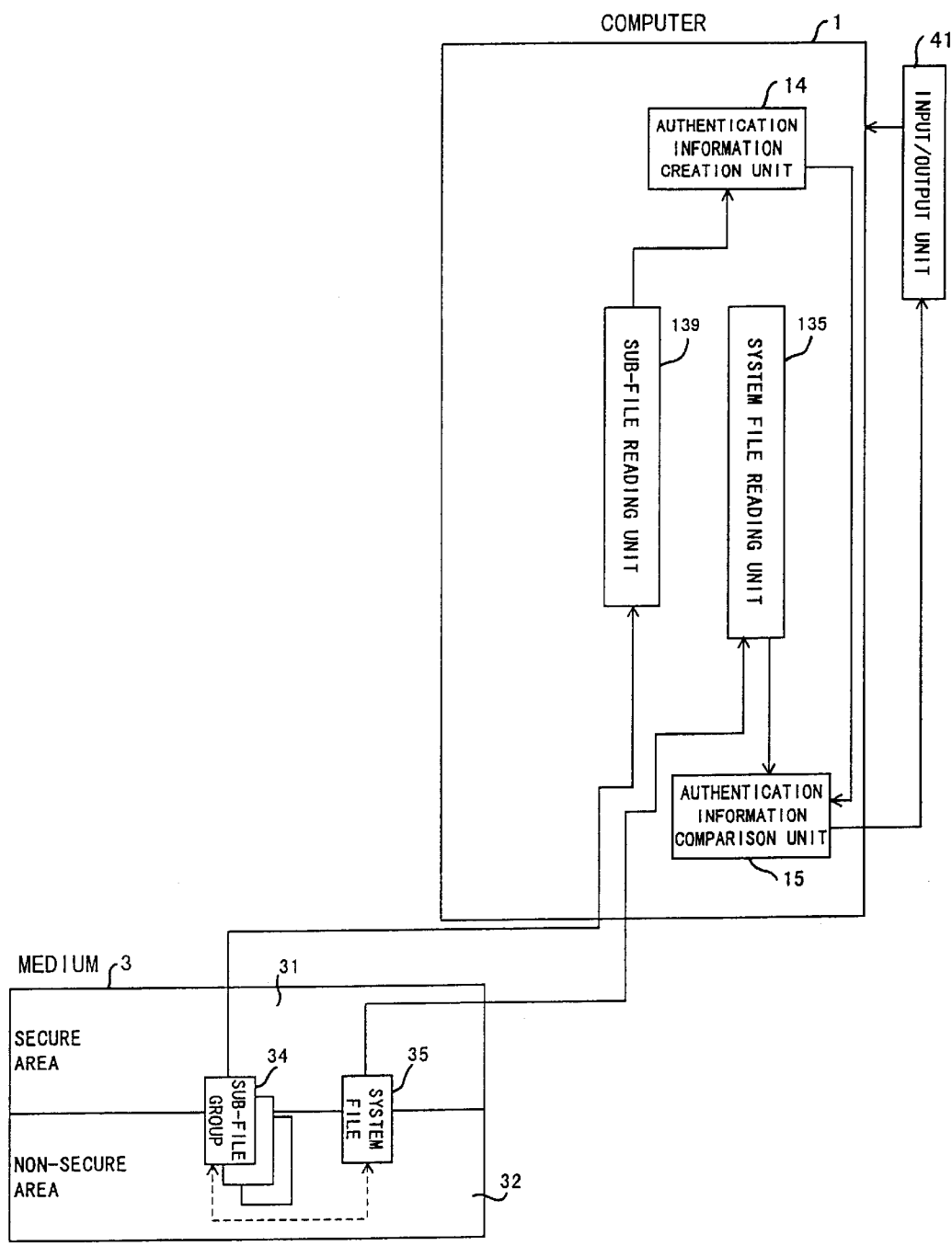
F I G. 1 6

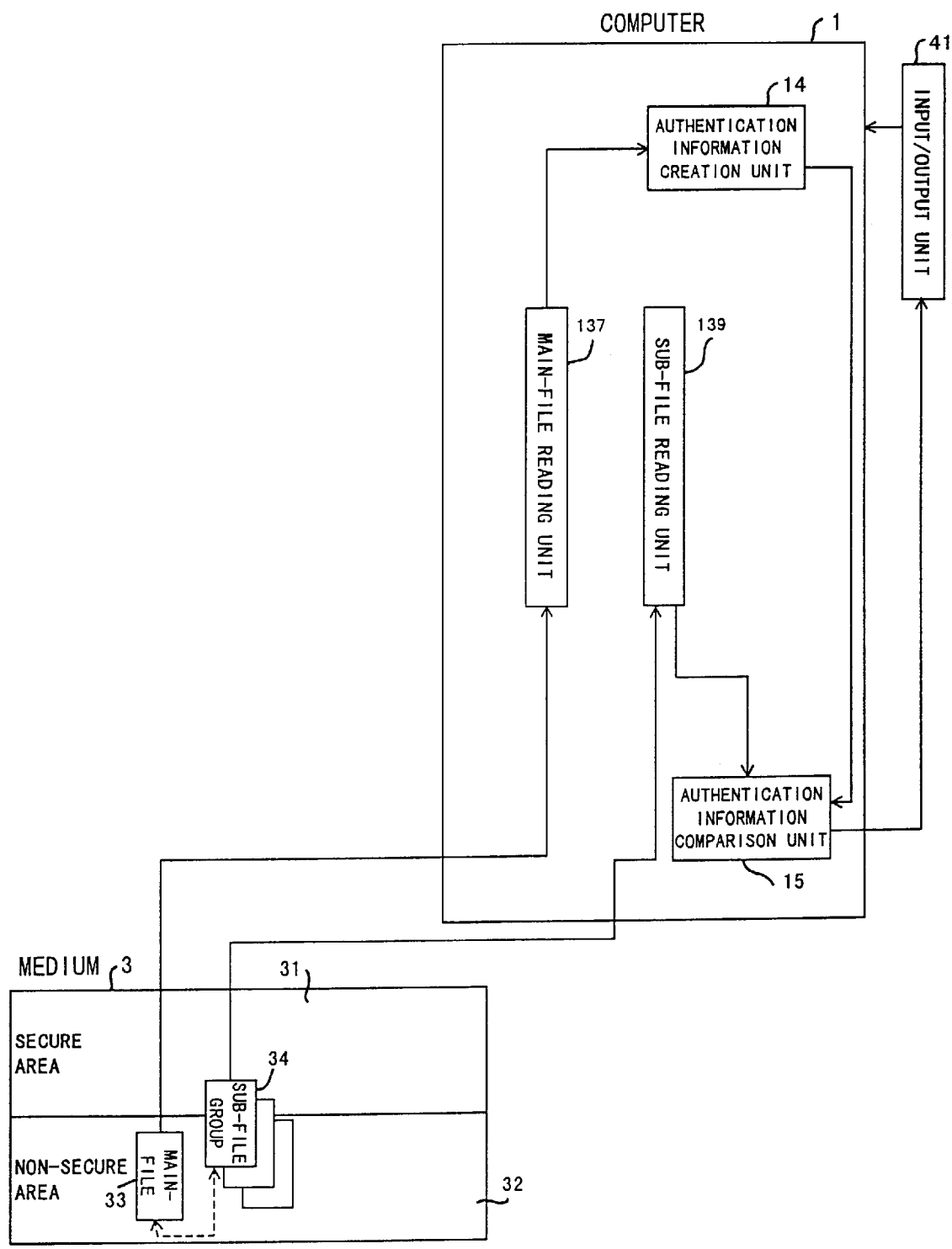
F I G. 18

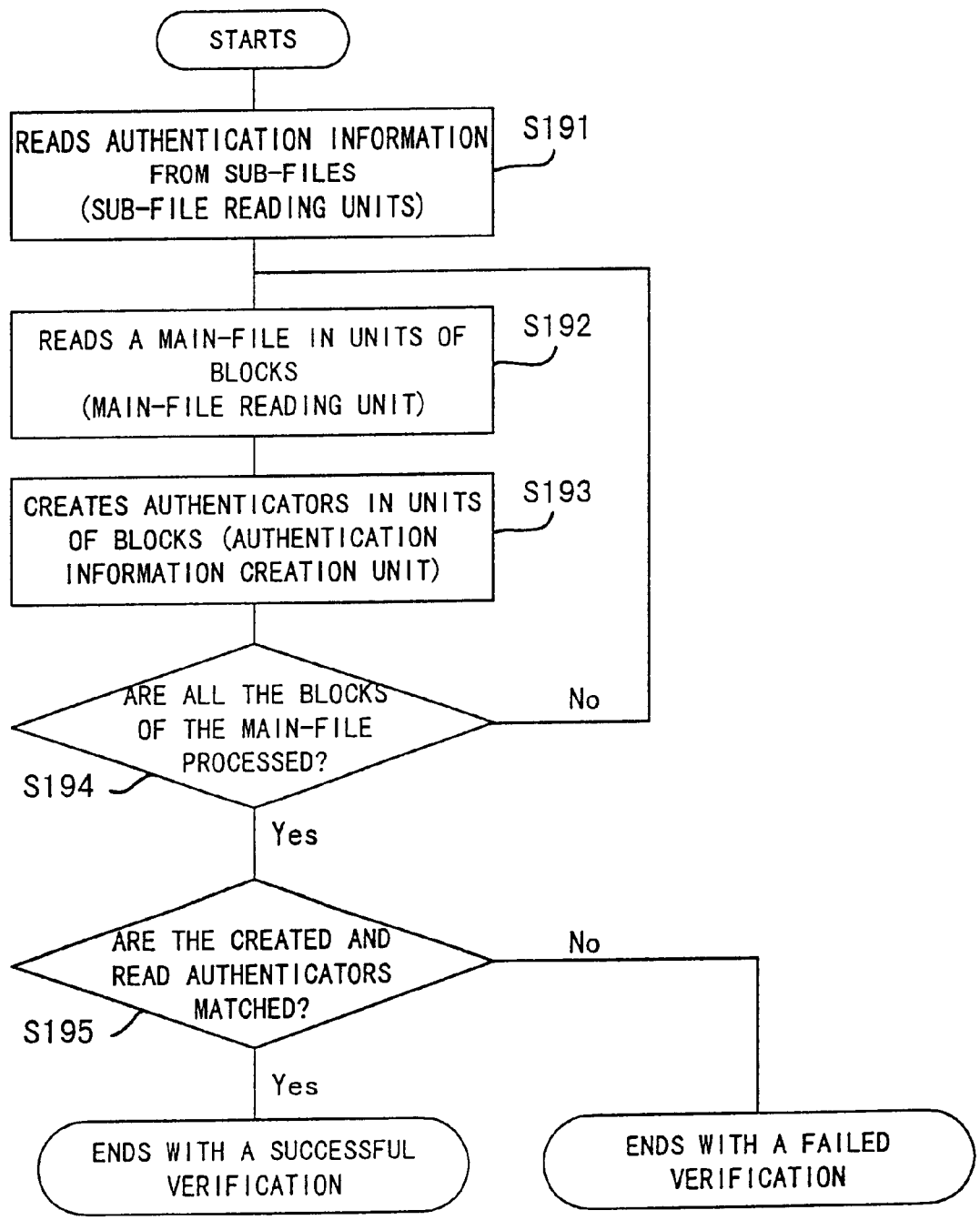
F I G. 1 9

APPARATUS METHOD AND COMPUTER READABLE STORAGE MEDIUM WITH RECORDED PROGRAM FOR MANAGING FILES WITH ALTERATION PREVENTING/DETECTING FUNCTIONS

BACKGROUND OF THE INVENTION

1. Field of the Invention

The present invention relates to a system for managing files having the functions of altering files and detecting the alteration of files, and more particularly to a file managing system for implementing the alteration prevention of files and detecting the alteration by storing authenticators indirectly created from files in an area inaccessible by the operator.

2. Description of the Related Art

As the computerization of official documents such as tax-related slips, etc. is promoted, a demand for keeping computerized data as evidence, safely and for a long time, in the same way as data is preserved on paper, has been increasing. The computerized documents can be very easily processed and reused, and can easily be added to, deleted from, corrected or transferred via a network, etc. For this reason, the computerized data involves a risk of being altered by a third party.

To solve this problem the applicant has applied the Japanese patent application No. 9-88485 ("File system and program storage medium" dated Apr. 7, 1997). This is a file system in which illegal alteration by the low-level access of illegal users, or illegal and malicious alteration by authorized users can be detected by linking the file management module in the OS (operating system) with a storage medium (secure medium) where an area usually unaccessible to users (secure area) can be set and preserving authenticators for detecting the alteration of data files, the access logs of data files, etc. in the secure area relating the authenticators, the access logs, etc. to the data files.

However, in the above-mentioned conventional example, since access to a secure area by users is usually protected by a file system, in a system without such a file system, the secure area can be easily accessed, and as a result, authenticators, access logs, etc. related to data files can often be altered freely.

Although a necessary secure area differs in size, since the sizes of access logs, etc. expand dynamically, usually it is difficult to modify the size of both a secure area and a normal area.

SUMMARY OF THE INVENTION

It is an object of the present invention to provide a system for managing files having alteration preventing/detecting functions for preventing a secure area from being easily accessed and preventing the authenticator and access log, etc. related to a data file from being freely altered, by means of reciprocal authentication obtained between a file system and a storing unit such as, for example, a unit of firmware.

It is another object of the present invention to provide a system for managing files having alteration preventing/detecting functions for dynamically modifying the size of both a secure area and a normal area by locating sub-files such as authenticators, access logs, etc. related to a data file being a main-file in the normal area, and locating only authenticators created from the sub-file in the secure area.

The system for managing files having alteration preventing/detecting functions of the present invention comprises a reciprocal authentication unit, an access allowing key storage unit, a file access unit, a main-file storage unit, a main-file reading unit, a sub-file storage unit, a sub-file reading unit, a system file storage unit, a system file reading unit, an authentication information creation unit, an authentication information comparison unit, an access allowing key group storage unit, an access allowing key identification unit and a secure area access unit.

In the first aspect of the present invention the reciprocal authentication unit creates an access allowing key. The access allowing key storage unit stores the access allowing key. The file access unit sends out an access request together with the access allowing key. The access allowing key group storage unit stores all the access allowing keys. The access allowing identification unit identifies if the access allowing key stored in the access allowing key storage unit and at least one access allowing key stored in the access allowing key group storage unit, are the same. The secure area access unit accesses a secure area normally unaccessible.

In the second aspect of the present invention the sub-file storage unit stores files. The authentication information creation unit creates sub-file authentication information used to verify the sub-files. The system file storage unit stores the sub-file authentication information relating the information to the main-file as a system file.

In the third aspect of the present invention the main-file storage unit stores a main-file. The authentication information creation unit creates main-file authentication information to be used to verify the main-file. The sub-file storage unit stores the main-file authentication information relating the information to the main-file as one of sub-files.

In the fourth aspect of the present invention the main-file storage unit stores a main-file. The authentication creation unit creates main-file authentication information to be used to verify the main-file. The sub-file storage unit stores the main-file authentication information relating the information to the main-file as one of sub-files. The sub-file storage unit stores one or a plurality of sub-files related to a main-file. The authentication information creation unit creates sub-file authentication information to be used to verify the sub-file. The system file storage unit stores the sub-file authentication information relating the information to the sub-file as a system file.

In the fifth aspect of the present invention the sub-file reading unit reads sub-files. The authentication information creation unit creates sub-file authentication information from sub-files read from the sub-file reading unit. The system file reading unit reads sub-file authentication information from a system file related to the sub-file. The authentication information comparison unit compares the sub-file authentication information created by the authentication information creation unit with the sub-file authentication information read by the system file reading unit.

In the sixth aspect of the present invention the main-file reading unit reads a main-file. The authentication information creation unit creates main-file authentication information from a main-file read from the main-file reading unit. The sub-file reading unit reads main-file authentication information from sub-files related to the main-file. The authentication information comparison unit compares the main-file authentication information created by the authentication information creation unit with the main-file authentication information read by the sub-file reading unit.

In the seventh aspect of the present invention the main-file reading unit reads a main-file. The sub-file reading unit reads one or a plurality of sub-files related to the main-file and the main-file authentication information from sub-files related to the main-file. The system file reading unit reads sub-file authentication information from a system file related to the sub-file. The authentication information creation unit creates main-file authentication information from a main-file read by the main-file reading unit, and creates sub-file authentication information from sub-files read by the sub-file reading unit. The authentication information comparison unit compares the main-file authentication information created by the authentication information creation unit with the main-file authentication information read by the sub-file reading unit, and compares the sub-file authentication information created by the authentication information creation unit with the sub-file authentication information read by the system file reading unit.

BRIEF DESCRIPTION OF THE DRAWINGS

The present invention will be more apparent from the following detailed description in conjunction with the accompanying drawings, in which:

FIG. 1 shows an entire configuration of a file management system having alteration preventing/detecting functions of the present invention.

FIG. 7 is a flowchart showing an operation of the second embodiment of this invention.

FIG. 11 is a flowchart showing an operation of the fourth embodiment of this invention.

FIG. 13 is a flowchart showing an operation of the fifth embodiment of this invention.

FIG. 16 shows a configuration of a file management system having alteration preventing/detecting functions of the eighth embodiment of this invention.

FIG. 18 shows a configuration of a file management system having alteration preventing/detecting functions of the ninth embodiment of this invention.

FIG. 19 is a flowchart showing an operation of the ninth embodiment of this invention.

DETAILED DESCRIPTION OF THE PREFERRED EMBODIMENTS

Figure 2:
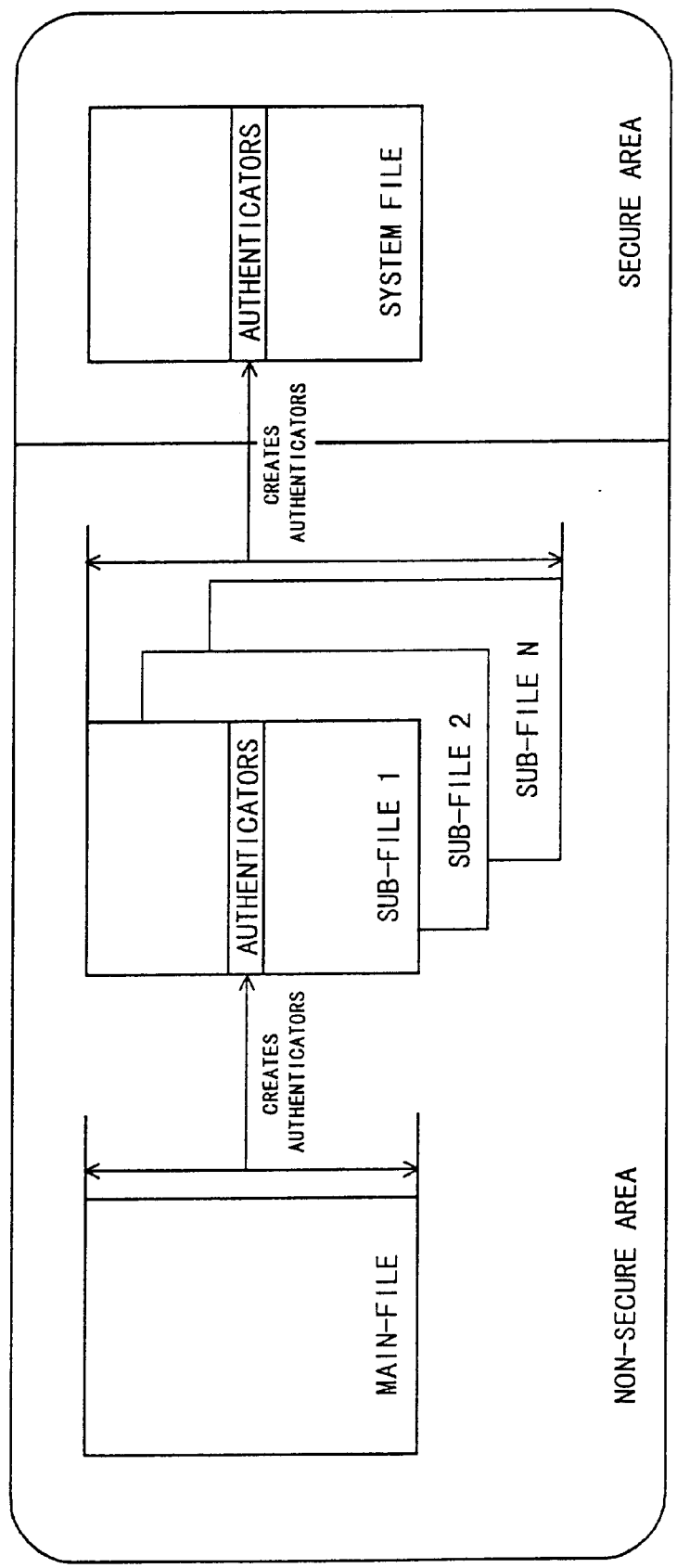
FIG. 2 explains a file composition of the present invention.

The embodiments of this invention are described in detail below with reference to the drawings.

The invention of claim 1 is a file system comprising a computer and a storage unit. The computer comprises a reciprocal authentication unit for reciprocally authenticating the computer with the storage unit and creating an access allowing key when the computer and storage unit are reciprocally authenticated, an access allowing key storage unit for storing the access allowing key, and a file access unit for sending an access request together with the access allowing key. The storage unit comprises a reciprocal authentication unit for reciprocally authenticating the storage unit with the computer and creating an access allowing key when the computer and storage unit are reciprocally authenticated, an access allowing key group storage unit for storing all the access allowing keys, an access allowing key identification unit for identifying if the access allowing key stored in the access allowing key storage unit and at least one access allowing key stored in the access allowing key group storage unit, are the same, and a secure area access unit for accessing a secure area usually unaccessible.

The invention of claim 2 is the file management system according to claim 1, wherein both the authentication unit of the computer and file access unit are implemented by a unit of hardware.

The invention of claim 3 is a file management system comprising a sub-file storage unit for storing one or a plurality of sub-files related to a main-file, an authentication information creation unit for creating sub-file authentication information to be used to verify the sub-files, and a system file storage unit for storing the sub-file authentication information relating the information to the sub-file as a system file.

The invention of claim 4 is a file management system comprising a main-file storage unit for storing a main-file, an authentication information creation unit for creating main-file authentication information to be used to verify the main-file, and a sub-file storage unit for storing one of sub-files to which the main-file authentication information is related.

The invention of claim 5 is a file management system comprising a main-file storage unit for storing a main-file, an authentication information creation unit for creating main-file authentication information to be used to verify the main-file, a sub-file storage unit for storing one of sub-files to which the main-file authentication information is related, a sub-file storage unit for storing one or a plurality of sub-files related to a main-file, an authentication information creation unit for creating sub-file authentication information to be used to verify the sub-file, and a system file storage unit for storing the sub-file authentication information relating the information to the sub-file as a system file.

The invention of claim 6 is a file management system according to claim 5, wherein the main-file, sub-files and system file are stored in a non-secure area usually accessible.

The invention of claim 7 is a file management system according to claim 5, wherein the main-file, and the sub-files and system file are stored in a non-secure area usually accessible and a secure area usually unaccessible, respectively.

The invention of claim 8 is a file management system according to claim 5, wherein the main-file and sub-files, and the system file are stored in a non-secure area usually accessible and a secure area usually unaccessible, respectively.

The invention of claim 9 is a file management system according to claim 6, comprising a computer and a storage unit, wherein the computer comprises a reciprocal authentication unit for reciprocally authenticating with the storage unit and creating an access allowing key when the computer and storage unit are reciprocally authenticated, an access allowing key storage unit for storing the access allowing key, and a file access unit for sending an access request together with the access allowing key. The storage unit comprises a reciprocal authentication unit for reciprocally authenticating with the computer and creating an access allowing key when the computer and storage unit are reciprocally authenticated, an access allowing key group storage unit for storing all the access allowing keys, an access allowing key identification unit for identifying if the access allowing key stored in the access allowing key storage unit and at least one access allowing key stored in the access allowing key group storage unit, are the same, and a secure area access unit for accessing a secure area usually unaccessible, and the authentication information creation unit reads a medium ID peculiar to a medium stored in the secure area after reciprocally authenticating the computer and storage unit and uses the medium ID to create both the main-file authentication information and sub-file authentication information.

The invention of claim 10 is a file management system according to claim 7, comprising a computer and a storage unit, wherein the computer comprises a reciprocal authentication unit for reciprocally authenticating with the computer and creating an access allowing key when the computer and storage unit are reciprocally authenticated, an access allowing key storage unit for storing the access allowing key, and a file access unit for sending an access request together with the access allowing key. The storage unit comprises a reciprocal authentication unit for reciprocally authenticating with the computer and creating an access allowing key when the computer and storage unit are reciprocally authenticated, an access allowing key group storage unit for storing all the access allowing keys, an access allowing key identification unit for identifying if the access allowing key stored in the access allowing key storage unit and at least one access allowing key stored in the access allowing key group storage unit, are the same, and a secure area access unit for accessing a secure area usually unaccessible. The authentication information creation unit reads a medium ID peculiar to a medium stored in the secure area after reciprocally authenticating the computer and storage unit and uses the medium ID to create both the main-file authentication information and sub-file authentication information.

The invention of claim 11 is a file management system according to claim 8, comprising a computer and a storage unit, wherein the computer comprises a reciprocal authentication unit for reciprocally authenticating with the storage unit and creating an access allowing key when the computer and storage unit are reciprocally authenticated, an access allowing key storage unit for storing the access allowing key, and a file access unit for sending an access request together with the access allowing key. The storage unit comprises a reciprocal authentication unit for reciprocally authenticating with the computer and creating an access allowing key when the computer and storage unit are reciprocally authenticated, an access allowing key group storage unit for storing all the access allowing keys, an access allowing key identification unit for identifying if the access allowing key stored in the access allowing key storage unit and at least one access allowing key stored in the access allowing key group storage unit, are the same, and a secure area access unit for accessing a secure area usually unaccessible. The authentication information creation unit reads a medium ID peculiar to a medium stored in the secure area after reciprocally authenticating the computer and storage unit, and uses the medium ID to create both the main-file authentication information and sub-file authentication information.

The invention of claim 12 is a file management system according to claim 9, wherein the reciprocal authentication information unit of the computer and the file access unit are implemented by means of hardware.

The invention of claim 13 is a file management system according to claim 9, wherein the medium ID is a card ID.

The invention of claim 14 is a file management system according to claim 9, wherein the medium ID is a master ID.

The invention of claim 15 is a file management system according to claim 9, wherein the authentication information is created for each record of a file.

The invention of claim 16 is a file management system according to claim 10, wherein the authentication information is created for each record of a file.

The invention of claim 17 is a file management system according to claim 11, wherein the authentication information is created for each record of a file.

The invention of claim 18 is a file management system comprising a sub-file reading unit for reading one or a plurality of sub-files related to a main-file, an authentication information creation unit for creating sub-file authentication information from sub-files read by the sub-file reading unit, a system file reading unit for reading sub-file authentication information from a system file related to the sub-file, and an authentication information comparison unit for comparing the sub-file authentication information created by the authentication information creation unit with the sub-file authentication information read by the system file reading unit.

The invention of claim 19 is a file management system comprising a main-file reading unit for reading a main-file, an authentication information creation unit for creating main-file authentication information from a main-file read by the main-file reading unit, a sub-file reading unit for reading main-file authentication information from sub-files related to the main-file, and an authentication information comparison unit for comparing the main-file authentication information created by the authentication information creation unit with the main-file authentication information read by the sub-file reading unit.

The invention of claim 20 is a file management system comprising a main-file reading unit for reading a main-file, a sub-file reading unit for reading main-file authentication information from one or a plurality of sub-files related to the main-file and sub-files related to the main-file, a system file reading unit for reading sub-file authentication information from a system file related to the sub-file, an authentication information creation unit for creating main-file authentication information from a main-file read by the main-file reading unit and creating sub-file authentication information from sub-files read from the sub-file reading unit, an authentication information comparison unit for comparing the main-file authentication information created by the authentication information creation unit with the main-file authentication information read by the sub-file reading unit and comparing the sub-file authentication information created by the authentication information creation unit with the sub-file authentication information read by the system file reading unit.

The invention of claim 21 is a file management system according to claim 20, wherein the main-file, sub-files and system file are stored in a non-secure area usually accessible.

The invention of claim 22 is a file management system according to claim 20, wherein the main-file, and the sub-files and system file are stored in a non-secure area usually accessible and a secure area usually unaccessible, respectively.

The invention of claim 23 is a file management system according to claim 20, wherein the main-file and sub-files, and the system file are stored in a non-secure area usually accessible and a secure area usually unaccessible, respectively.

The invention of claim 24 is a file management system according to claim 21, comprising a computer and a storage unit, wherein the computer comprises a reciprocal authentication unit for reciprocally authenticating with the storage unit and creating an access allowing key when the computer and storage unit are reciprocally authenticated, an access allowing key storage unit for storing the access allowing key, and a file access unit for sending an access request together with the access allowing key. The storage unit comprises a reciprocal authentication unit for reciprocally authenticating with the computer and creating an access allowing key when the computer and storage unit are reciprocally authenticated, an access allowing key group storage unit for storing all the access allowing keys, an access allowing key identification unit for identifying if the access allowing key stored in the access allowing key storage unit and at least one access allowing key stored in the access allowing key group storage unit, are the same, and a secure area access unit for accessing a secure area usually unaccessible. The authentication information creation unit reads a medium ID peculiar to a medium stored in the secure area after reciprocally authenticating the computer and storage unit, and uses the medium ID to create both the main-file authentication information and sub-file authentication information.

The invention of claim 25 is a file management system according to claim 22, comprising a computer and a storage unit, wherein the computer comprises a reciprocal authentication unit for reciprocally authenticating with the storage unit and creating an access allowing key when the computer and storage unit are reciprocally authenticated, an access allowing key storage unit for storing the access allowing key and a file access unit for sending an access request together with the access allowing key, the storage unit comprises a reciprocal authentication unit for reciprocally authenticating with the computer and creating an access allowing key when the computer and storage unit are reciprocally authenticated, an access allowing key group storage unit for storing all the access allowing keys, an access allowing key identification unit for identifying if the access allowing key stored in the access allowing key storage unit and at least one access allowing key stored in the access allowing key group storage unit, are the same, and a secure area access unit for accessing a secure area usually unaccessible. The authentication information creation unit reads a medium ID peculiar to a medium stored in the secure area after reciprocally authenticating the computer and storage unit and uses the medium ID to create both the main-file authentication information and sub-file authentication information.

The invention of claim 26 is a file management system according to claim 23, comprising a computer and a storage unit, wherein the computer comprises a reciprocal authentication unit for reciprocally authenticating with the storage unit and creating an access allowing key when the computer and storage unit are reciprocally authenticated, an access allowing key storage unit for storing the access allowing key, and a file access unit for sending an access request together with the access allowing key. The storage unit comprises a reciprocal authentication unit for reciprocally authenticating with the computer and creating an access allowing key when the computer and storage unit are reciprocally authenticated, an access allowing key group storage unit for storing all the access allowing keys, an access allowing key identification unit for identifying if the access allowing key stored in the access allowing key storage unit and at least one access allowing key stored in the access allowing key group storage unit, are the same, and a secure area access unit for accessing a secure area usually unaccessible. The authentication information creation unit reads a medium ID peculiar to a medium stored in the secure area after reciprocally authenticating the computer and storage unit, and uses the medium ID to create both the main-file authentication information and sub-file authentication information.

The invention of claim 27 is a file management system according to claim 24, wherein the reciprocal authentication unit of the computer and the file access unit are implemented by means of hardware.

The invention of claim 28 is a file management system according to claim 24, wherein the medium ID is a card ID.

The invention of claim 29 is a file management system according to claim 24, wherein the medium ID is a master ID.

The invention of claim 30 is a file management system according to claim 24, wherein the authentication information is created for each record of a file.

The invention of claim 31 is a file management system according to claim 1, wherein the storage unit comprises a sector access unit for accessing a main-file or sub-files related to the main-file in units of sectors or sector groups, and the secure area access unit comprises an access control information reading unit for reading access control information stored in the secure area.

The invention of claim 32 is a file management system according to claim 31, wherein the secure area access unit further comprises an access control information setting unit for setting access control information in the secure area.

The invention of claim 33 is a file management system according to claim 9, wherein authentication information is created using one, two or all of the medium ID, card ID and master ID.

The invention of claim 34 is a file management system according to claim 24, wherein authentication information is created using one, two or all of the medium ID, card ID and master ID.

The invention of claim 35 is a file management method comprising the reciprocal authentication step of creating an access allowing key, the access allowing key storing step of storing the access allowing keys, the file access step of sending an access request together with the access allowing key, the access allowing key group storing step of storing all the access allowing keys, the access allowing key identifying step of identifying if the access allowing key stored in the access allowing key storing step and at least one access allowing key stored in the access allowing key group storing step, are the same, and the secure area accessing step of accessing a secure area usually unaccessible when reciprocal authentication is carried out between a computer and a storage unit and when the computer and the storage unit are reciprocally authenticated.

The invention of claim 36 is a computer readable storage medium with a recorded file management program for enabling a computer to implement the reciprocal authentication step of creating an access allowing key, the access allowing key storing step of storing the access allowing key, the file access step of sending an access request together with the access allowing key, the access allowing key group storing step of storing all the access allowing keys, the access allowing key identifying step of identifying if the access allowing key stored in the access allowing key storing step and at least one access allowing key stored in the access allowing key group storing step, are the same, and the secure area accessing step of accessing a secure area usually unaccessible when reciprocal authentication is carried out between a computer and a storage unit and when the computer and the storage unit are reciprocally authenticated.

FIG. 1 shows the entire configuration of the file management system having the alteration preventing/detecting functions of the present invention.

Each component unit is described later with reference to FIGS. 4, 6, 8, 10, 12, 14, 15, 16, 18, 20, 22, 24, 25, 26, 28 and 30 while describing each embodiment of this invention.

Each component unit on a computer 1 side such as a reciprocal authentication unit 11, authentication information creation unit 14 and authentication information comparison unit 15, etc., can be a software subroutine of a file management module in an OS, or can be constructed by means of hardware.

FIG. 2 explains the file composition of the present invention.

Authenticators created from a main-file are stored in sub-files, and authenticators created from sub-files are stored in a system file.

Figure 3:
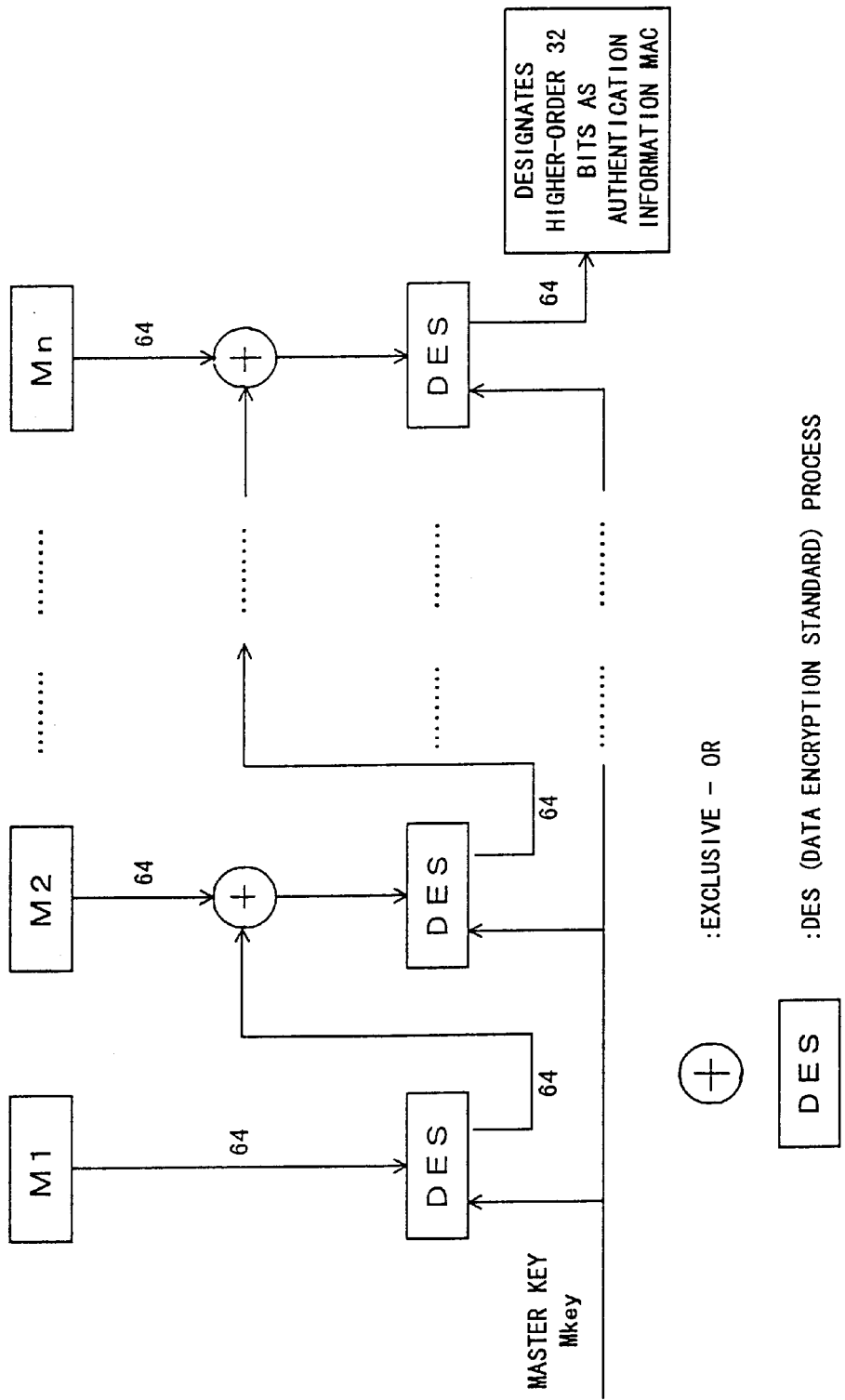
FIG. 3 explains a calculation method of a message authentication code (MAC) process.

FIG. 3 explains the calculation method of a message authentication code (MAC) processing.

Source data such as a main-file, sub-files, etc. are divided, for example, into several blocks of 64 bits, and are ciphered. The exclusive-ORs of the ciphered value and the next 64 bits are calculated, and are also ciphered. Although each ciphered value or a part of the value, for example, the higher-order 32 bits, can be made an authenticator, in each embodiment of this invention described later, this process is repeated to the last block of the source data, and higher-order 32 bits finally obtained shall be an authenticator.

Figure 4:
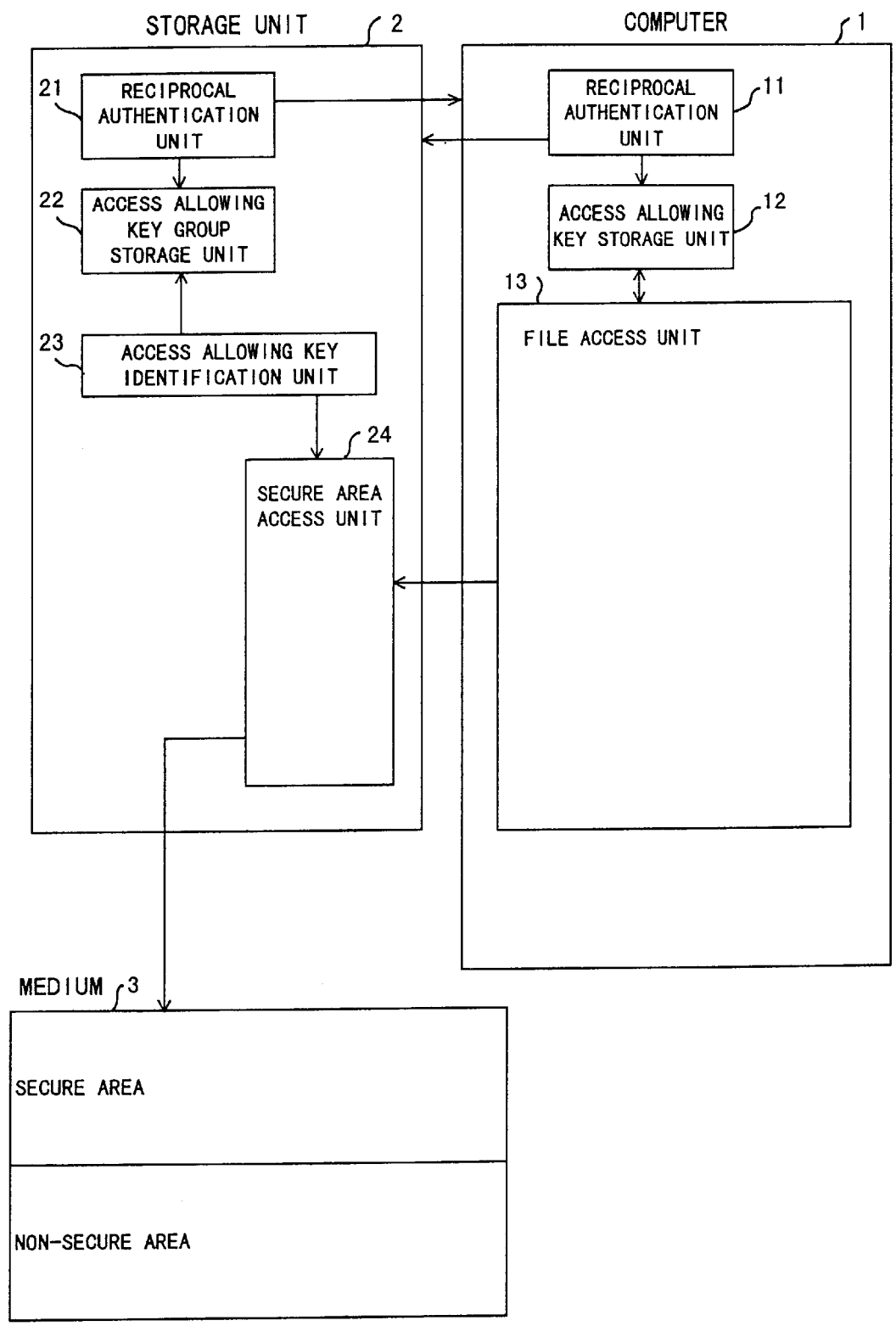
FIG. 4 shows a configuration of a file management system having alteration preventing/detecting functions of the first embodiment of this invention.
Figure 5:
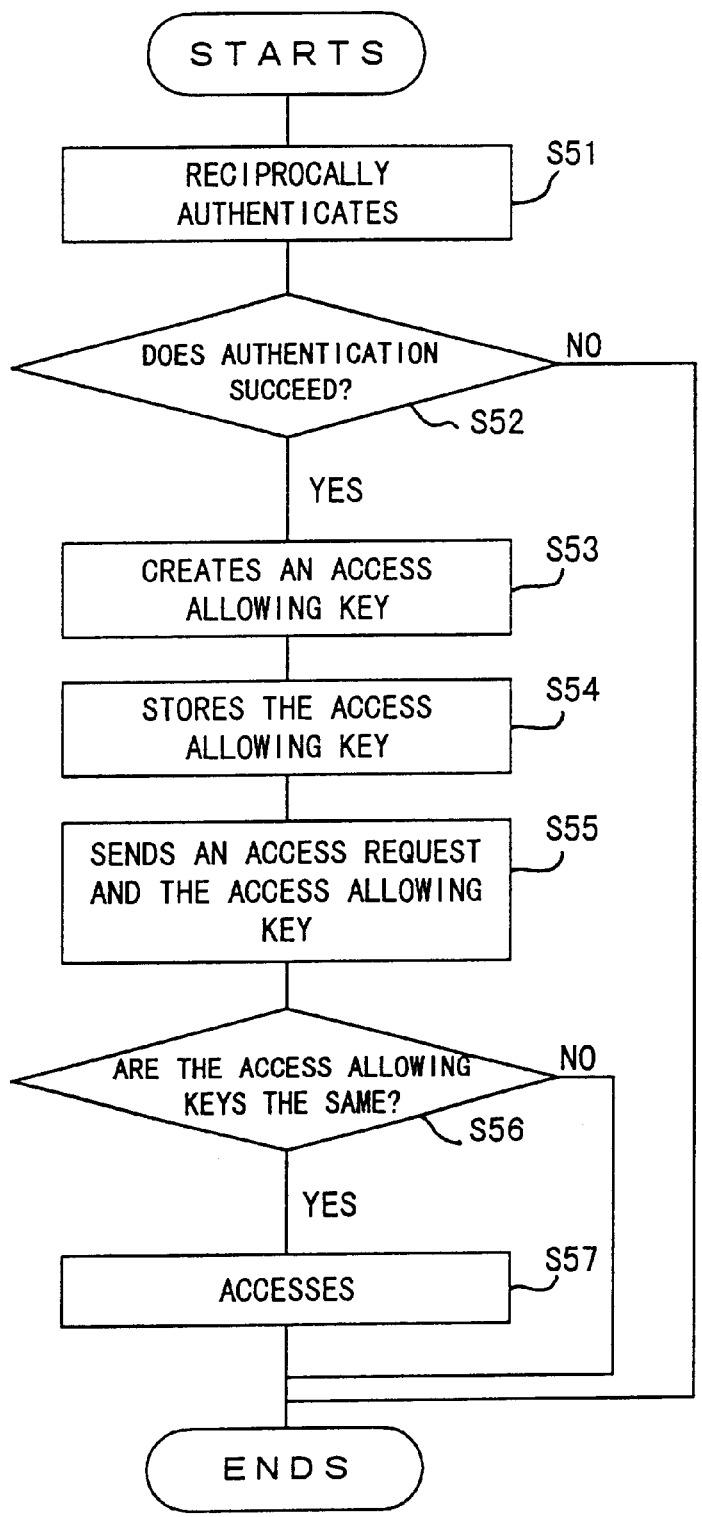
FIG. 5 is a flowchart showing an operation of the first embodiment of this invention.

FIG. 4 shows the configuration of the file management system having the alteration preventing/detecting functions of the first embodiment of this invention. FIG. 5 is a flowchart showing the operation of the first embodiment of this invention.

In step S51 the reciprocal authentication unit 11 on the computer 1 side and the reciprocal authentication unit 21 on the storage unit 2 side are reciprocally authenticated. If in step S52 the reciprocal authentication succeeds, in step S53 a common access allowing key is created. In step S54 the reciprocal authentication unit 11 on the computer 1 side transfers the created allowing key to an access allowing key storage unit 12, and the key is stored in the storage unit 12. The reciprocal authentication unit 21 on the storage unit 2 side also transfers the created allowing key to an access allowing key storage unit 22, and the key is stored in the storage unit 22. The reciprocal authentication method shall use, for example, a general open key.

In step S55, when accessing a secure area 31 in a medium 3 to be accessed via the storage unit 2, a file access unit 13 sends the access allowing key to a secure area access unit 24 of the storage unit 2 together with an access request.

In step S56 an access allowing key identification unit 23 judges whether or not there is the same access allowing key as the access allowing key sent from the file access unit 13 to the secure area access unit 24 together with the access request, in the access allowing key storage unit 22. If there is the same access allowing key, in step S57 the secure area access unit 24 accesses a secure area 31.

Each of the reciprocal authentication unit 11 and file access unit 13 on the computer side 1 can be a software subroutine of a file management module in an OS or can be constructed by means of hardware.

Figure 6:
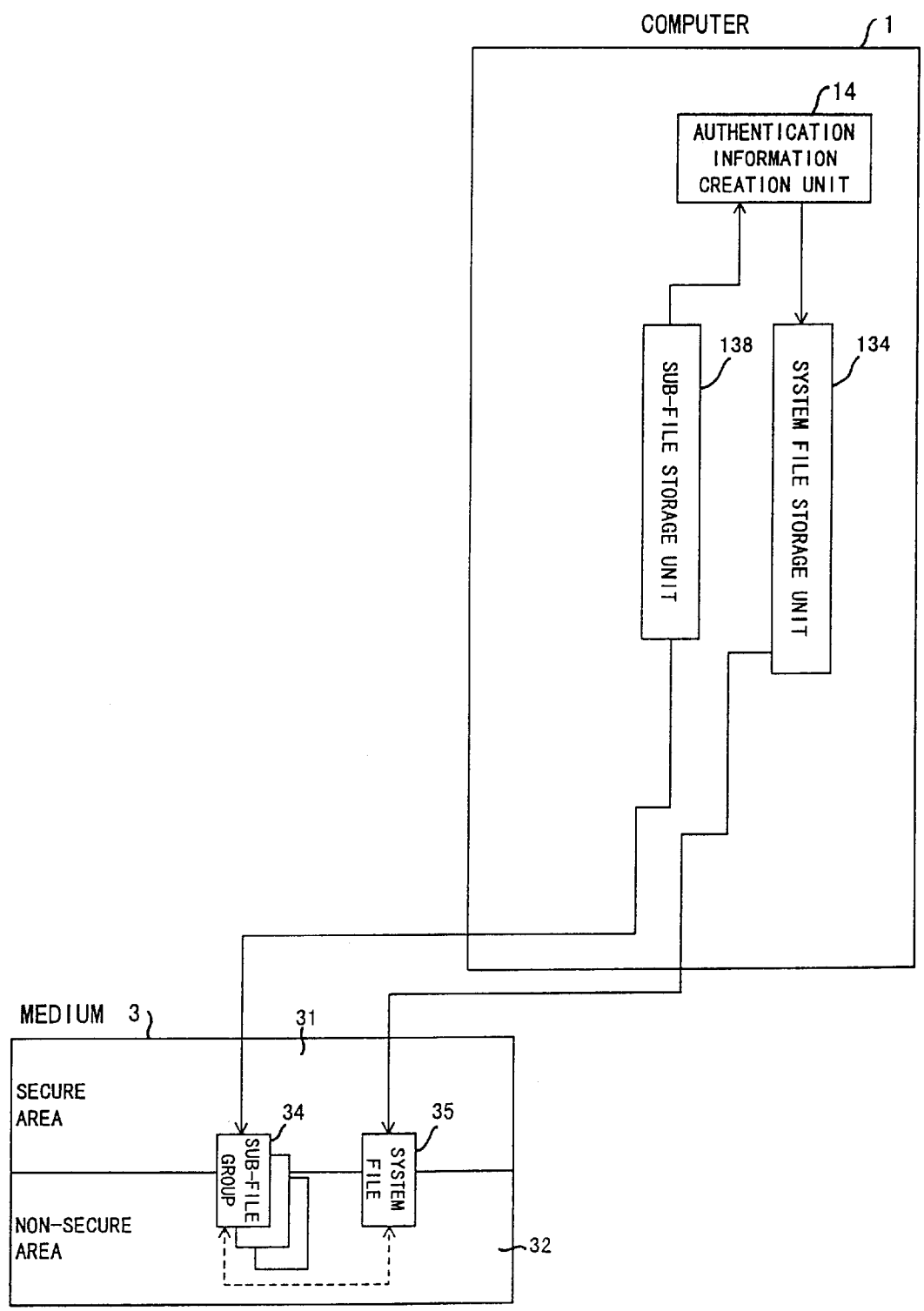
FIG. 6 shows a configuration of a file management system having alteration preventing/detecting functions of the second embodiment of this invention.

FIG. 6 shows the configuration of the file management system having the alteration preventing/detecting functions of the second embodiment of this invention. FIG. 7 is a flowchart showing the operation of the second embodiment of this invention.

In step S71 a sub-file storage unit 138 stores sub-files 34 in the medium 3 in units of blocks, if there is still another sub-file 34 to be processed when the flow returns from the process in step S74, described later, the sub-file storage unit 138 reads the sub-file 34, and combines the sub-file 34 with the already stored sub-files 34, and transfers the combined sub-file to an authentication information creation unit 14.

In step S72 the authentication information creation unit 14 creates an authenticator being authentication information from the combined sub-file, which is transferred to a system file storage unit 134. In step S73 it is checked whether or not all the blocks of the sub-file 34 are processed. If there is still another block to be processed, the flow returns to step S71, where the next block of the sub-file 34 is processed.

In step S73 it is checked whether or not all the plurality of sub-files 34 are processed. If there is still another sub-file 34 to be processed, the flow returns to step S71, where the next sub-file 34 is processed.

In step S74 the system file storage unit 134 makes a set of an arbitrary ID for exclusively identifying both a main-file 33 and a sub-file group 34, and an authenticator being authentication information, and stores the set in a system file 35.

Figure 8:
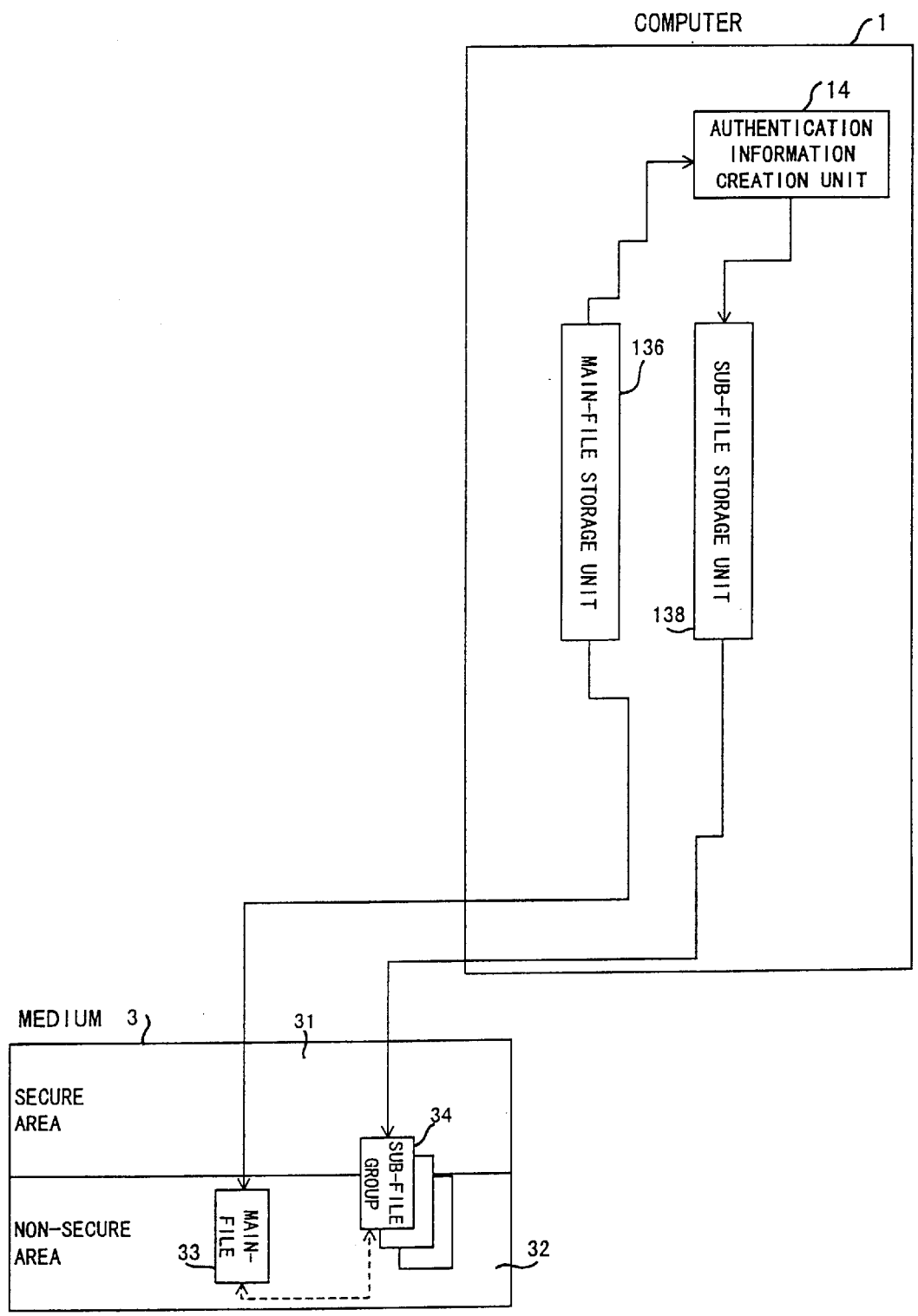
FIG. 8 shows a configuration of a file management system having alteration preventing/detecting functions of the third embodiment of this invention.
Figure 9:
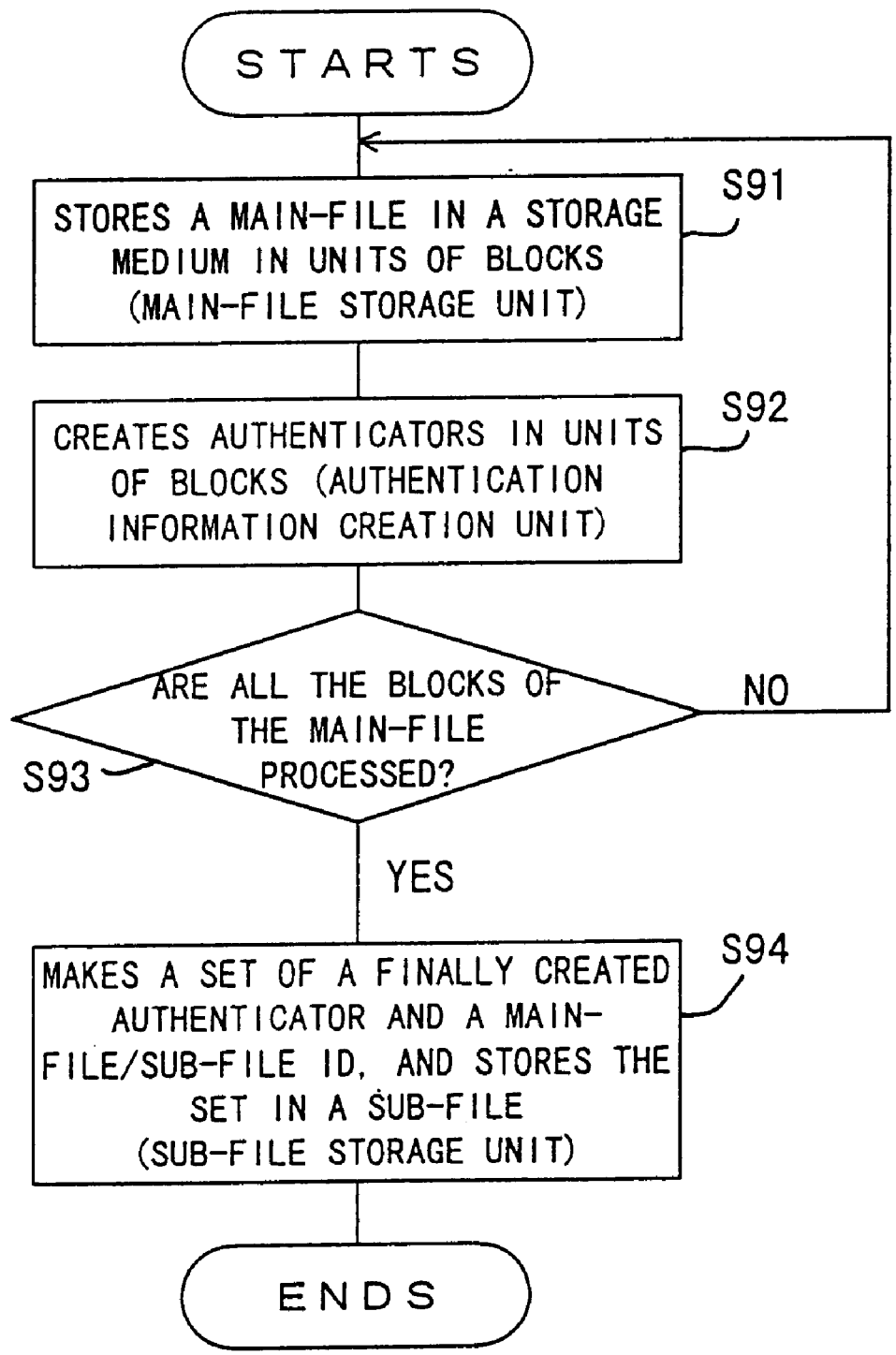
FIG. 9 is a flowchart showing an operation of the third embodiment of this invention.

FIG. 8 shows the configuration of the file management system having the alteration preventing/detecting functions of the third embodiment of this invention. FIG. 9 is a flowchart showing the operation of the third embodiment of this invention.

In step S91 a main-file storage unit 136 stores the main-file 33 in the medium 3 in units of blocks, and also transfers the main-file 33 to the authentication information creation unit 14.

In step S92, when receiving this main-file 33, the authentication information creation unit 14 creates an authenticator being authentication information, and transfers the authenticator to the sub-file storage unit 138. In step S93 it is checked whether or not all the blocks of the main-file 33 are processed. If there is still another block to be processed, the flow returns to step S91, where the next block of the main-file 33 is processed.

In step S94 the sub-file storage unit 138 makes a set of an arbitrary ID for exclusively identifying a main-file 33 and an authenticator being authentication information, and stores the set in a specific sub-file 34.

Figure 10:
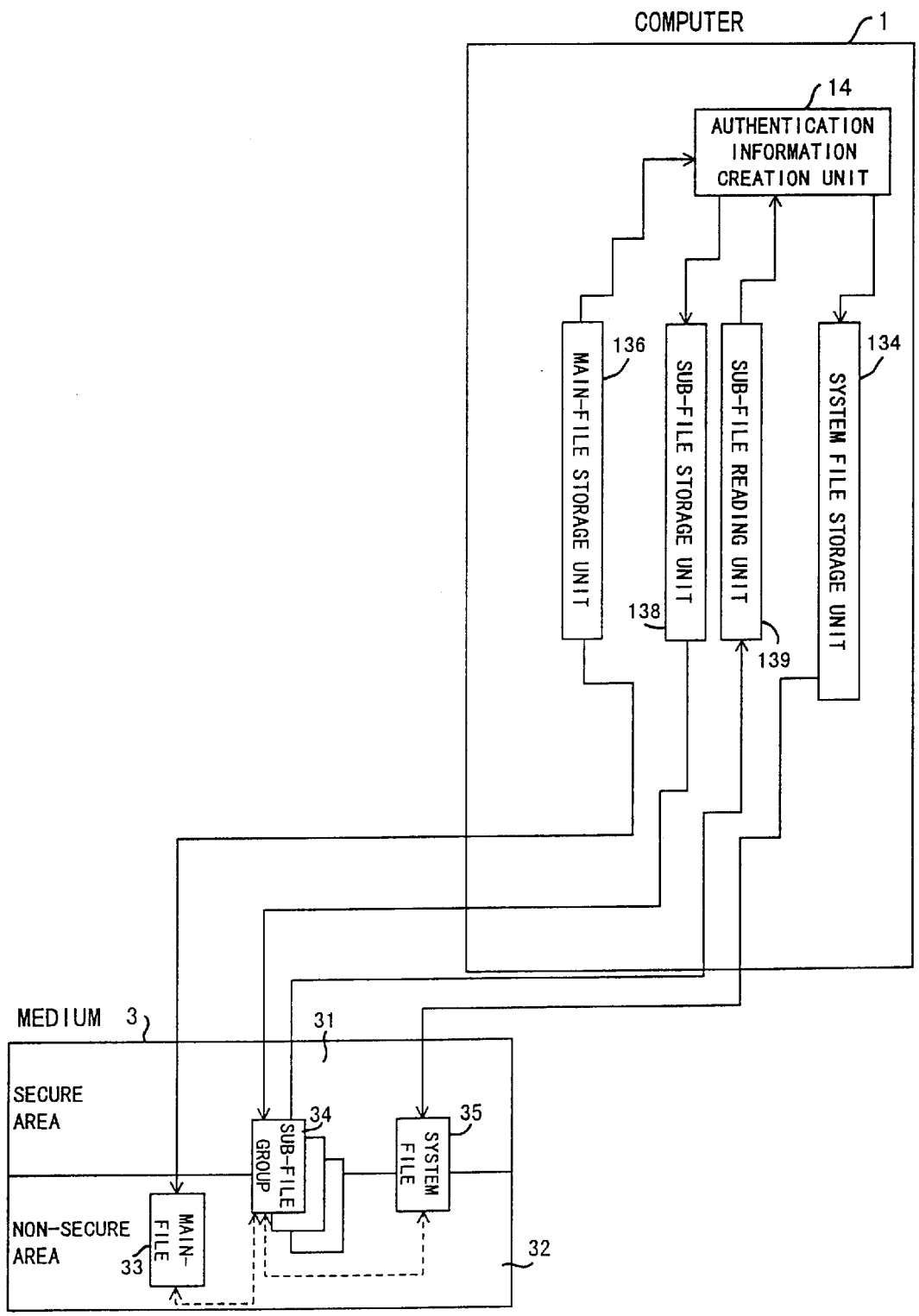
FIG. 10 shows a configuration of a file management system having alteration preventing/detecting functions of the fourth embodiment of this invention.

FIG. 10 shows the configuration of the file management system having the alteration preventing/detecting functions of the fourth embodiment of this invention. FIG. 11 is a flowchart showing the operation of the fourth embodiment of this invention.

In step S111 the main-file storage unit 136 stores the main-file 33 in the medium 3 in units of blocks, and transfers the main-file 33 to the authentication information creation unit 14.

In step S112 the authentication information creation unit 14 creates an authenticator being authentication information from the main-file 33, and transfers the authenticator to the sub-file storage unit 138. In step S113 it is checked whether or not all the blocks of the main-file 33 are processed. If there is still another block to be processed, the flow returns to step S111, where the next block of the main-file 33 is processed.

In step S114 the sub-file storage unit 138 makes a set of an arbitrary ID for exclusively identifying a main-file 33 and an authenticator being authentication information, and stores the authenticator in a specific sub-file 34.

Then, in step S115 a sub-file reading unit 139 reads the sub-file group 34, and transfers the sub-file group 34 to the authentication information creation unit 14.

In step S116 the authentication information creation unit 14 creates an authenticator being authentication information, and transfers the authenticator to the system file storage unit 134. In step S117 it is checked whether or not all the blocks of the sub-file 34 are processed. If there is still another block to be processed, the flow returns to step S115, where the next block of the sub-file 34 is processed.

In step S118 it is checked whether or not all the plurality of sub-files 34 are processed. If there is still another sub-file 34 to be processed, the flow returns to step S115, where the next sub-file 34 is processed. By executing this process on all of the sub-files, the sub-file reading unit 139 is able to read all of the sub-files in the sub-file group 34, and is able to transfer all of the sub-files in the sub-file group 34 to the authentication information creation unit 14.

In step S119 the system file storage unit 134 makes a set of an arbitrary ID for exclusively identifying both main-file 33 and sub-file group 34, and an authenticator being authentication information, and stores the set in the system file 35.

Although the main-file 33 is stored in a non-secure area 32, the sub-files 34 and system file 35 can be stored in either the secure area 31 or the non-secure area 32.

That is, the main-file 33 being actual data has to be stored in the non-secure area 32, and since the sub-files 34 and system file 35 are not directly required to be accessed nor are directly accessed, the sub-files 34 and system file 35 can be stored in either the secure area 31 or the non-secure area 32.

Figure 12:
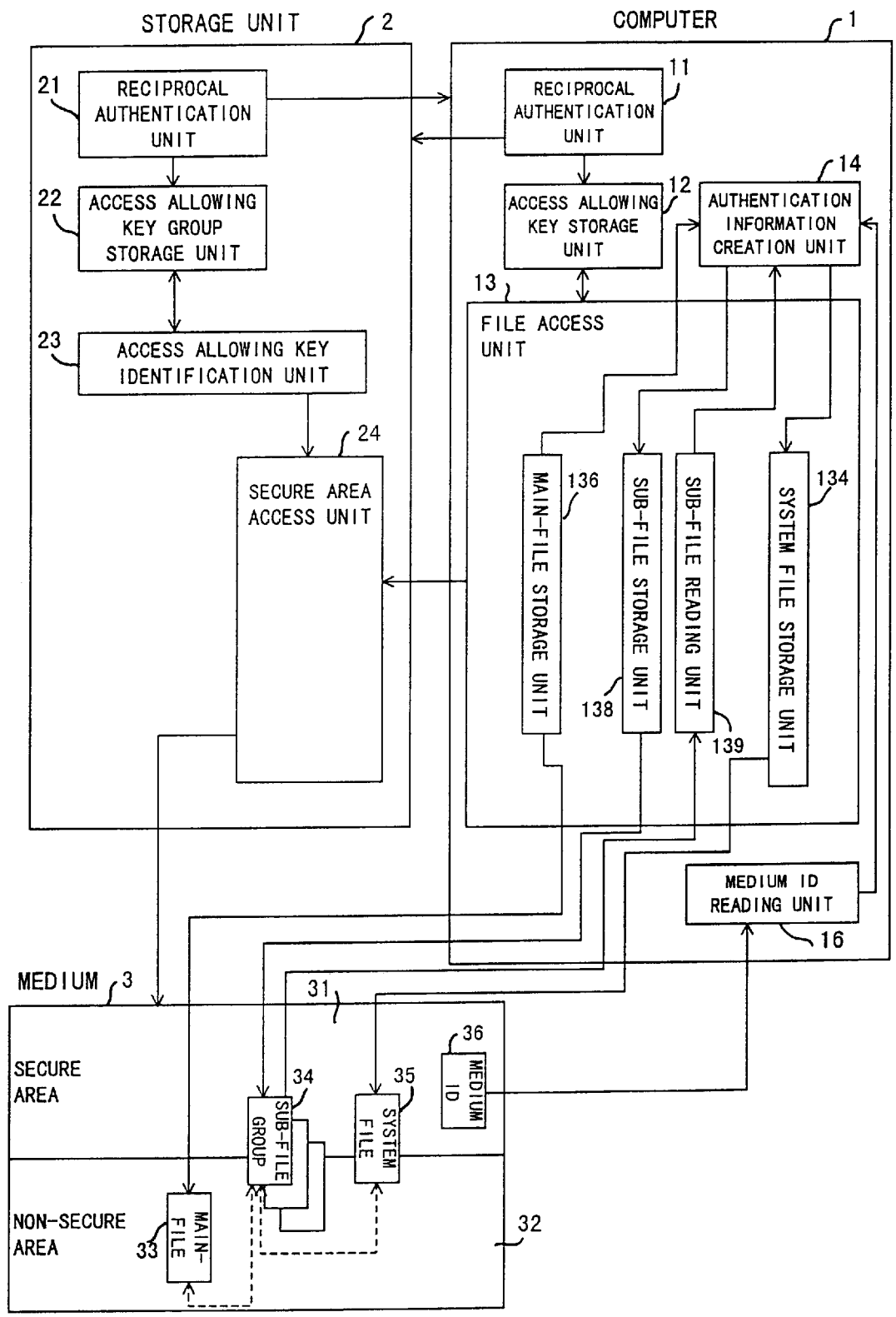
FIG. 12 shows a configuration of a file management system having alteration preventing/detecting functions of the fifth embodiment of this invention.

FIG. 12 shows the configuration of the file management system having the alteration preventing/detecting functions of the fifth embodiment of this invention. FIG. 13 is a flowchart showing the operation of the fifth embodiment of this invention.

The reciprocal authentication described in the first embodiment of this invention is carried out in advance.

In step S130 a medium ID reading unit 16 reads a medium ID 36 from the secure area 31 in the medium 3, and transfers the medium ID 36 to the authentication information creation unit 14.

In step S131 the main-file storage unit 136 stores the main-file 33 in the medium 3 in units of blocks, and also transfers the main-file 33 to the authentication information creation unit 14.

In step S132, when receiving the main-file 33, the authentication information creation unit 14 creates an authenticator being authentication information from the main-file 33 using the medium ID 36 as a key, and transfers the authenticator to the sub-file storage unit 138. It is assumed here that the authenticator is created using a data encryption standard-message authentication code (DES-MAC).

In step S133 it is checked whether or not all the blocks of the main-file 33 are processed. If there is still another block to be processed, the flow returns to step S131, and the next block of the main-file 33 is processed.

In step S134 the sub-file storage unit 138 makes a set of an arbitrary ID for exclusively identifying a main-file 33 and an authenticator being authentication information, and stores the set in a specific sub-file 34.

Then, in step S135 a sub-file reading unit 139 reads sub-files, and transfers the sub-files to the authentication information creation unit 14. Furthermore, when the flow returns from the process in step S138, described later, the sub-file reading unit 139 combines the data stored in step S134, and transfers the data to the authentication information creation unit 14. That is, the sub-file reading unit 139 reads all of the sub-file group 34, combines all of the stored sub-file group 34, and transfers the sub-file group 34 to the authentication information creation unit 14.

In step S136 the authentication information creation unit 14 creates an authenticator being authentication information in the same way as described above, and transfers the authenticator to the system file storage unit 134.

In step S137 it is checked whether or not all the blocks of the sub-file 34 are processed. If there is still another block to be processed, the flow returns to step S135, where the next block of the sub-file 34 is processed.

In step S138 it is checked whether or not all the plurality of sub-files 34 are processed. If there is still another sub-file 34 to be processed, the flow returns to step S135, where the next sub-file 34 is processed.

In step S139 the system file storage unit 134 makes a set of an arbitrary ID for exclusively identifying both the main-file 33 and sub-files 34, and authentication information, and stores the set in the system file 35.

The medium ID 36 used as a key when creating the authenticator can also be read from the medium 3 in advance.

Furthermore, the above-mentioned process can also be executed for each record composing the file of the main-file 33 and sub-files 34.

Figure 14:
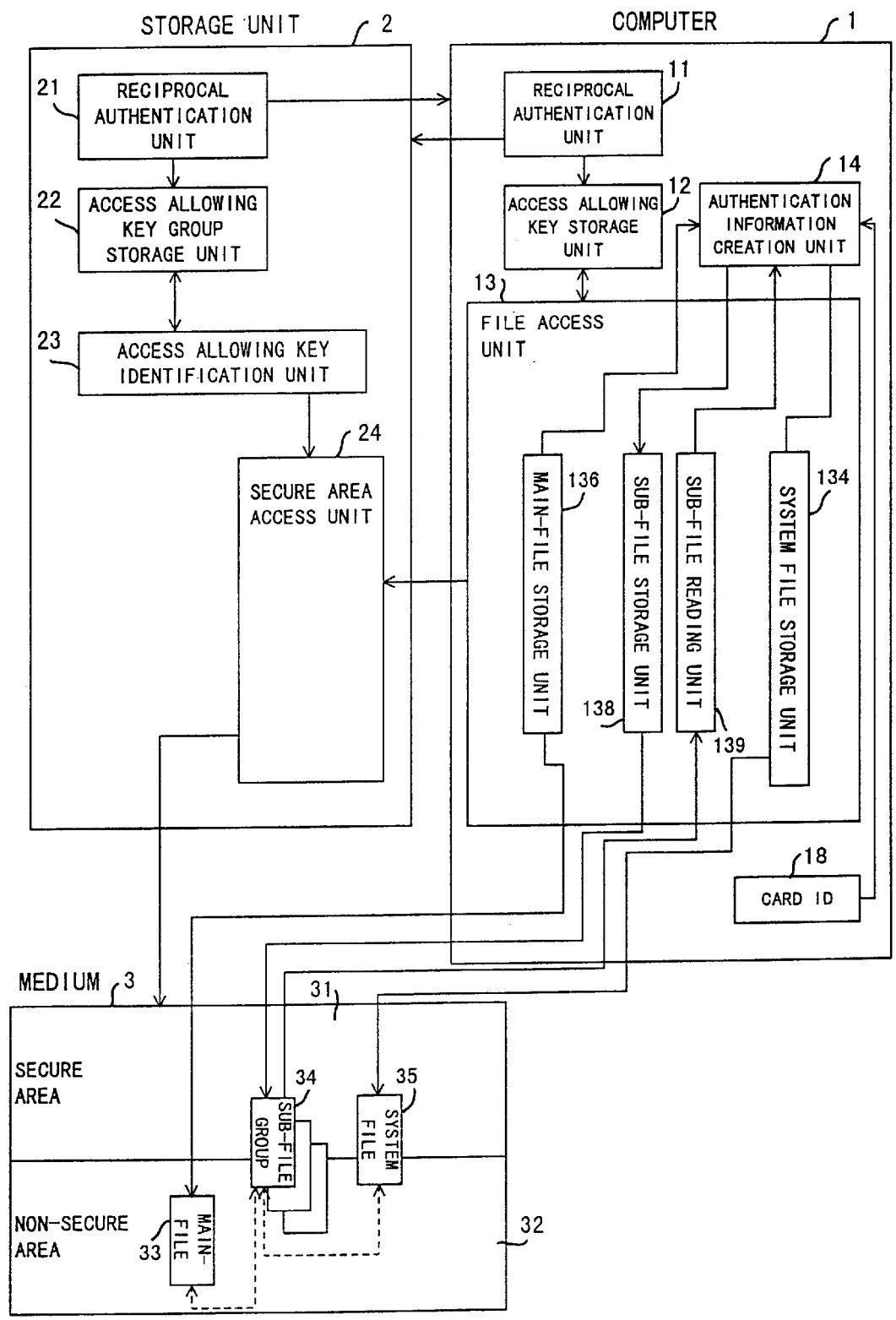
FIG. 14 shows a configuration of a file management system having alteration preventing/detecting functions of the sixth embodiment of this invention.

FIG. 14 shows the configuration of the file management system having the alteration preventing/detecting functions of the sixth embodiment of this invention.

The configuration and basic operation of the sixth embodiment of this invention are the same as the configuration and basic operation of the fifth embodiment of this invention, except that the medium ID 36 read by the medium ID reading unit 16 in the fifth embodiment of this invention described with reference to FIG. 12, is replaced with a card ID 18 in the sixth embodiment of this invention.

Figure 15:
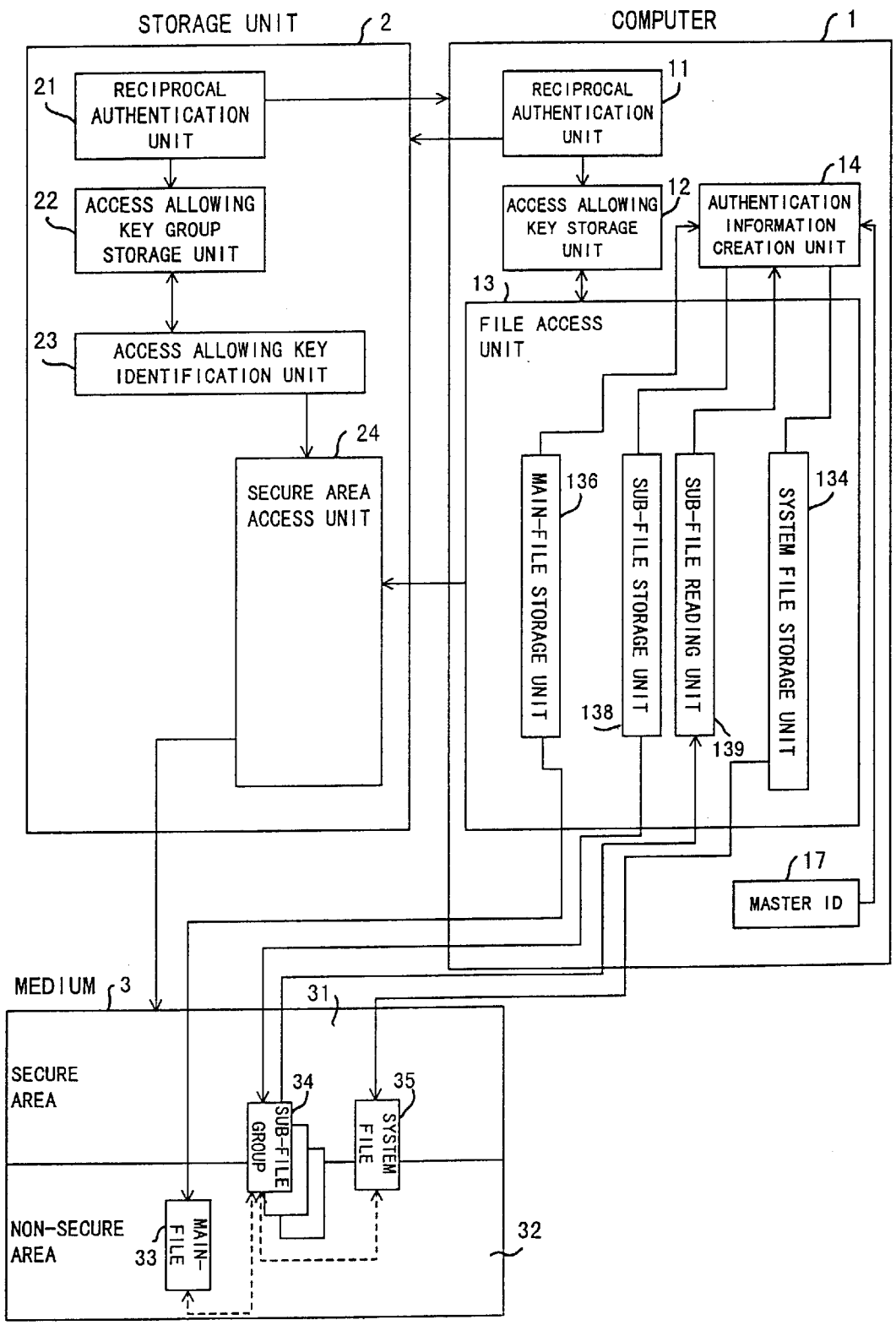
FIG. 15 shows a configuration of a file management system having alteration preventing/detecting functions of the seventh embodiment of this invention.

FIG. 15 shows the configuration of the file management system having the alteration preventing/detecting functions of the seventh embodiment of this invention.

The configuration and basic operation of the seventh embodiment of this invention are the same as the configuration and basic operation of the fifth embodiment of this invention, except that the medium ID 36 read by the medium ID reading unit 16 in the fifth embodiment of this invention described with reference to FIG. 12 is replaced with a master ID 17 in the seventh embodiment of this invention.

Figure 17:
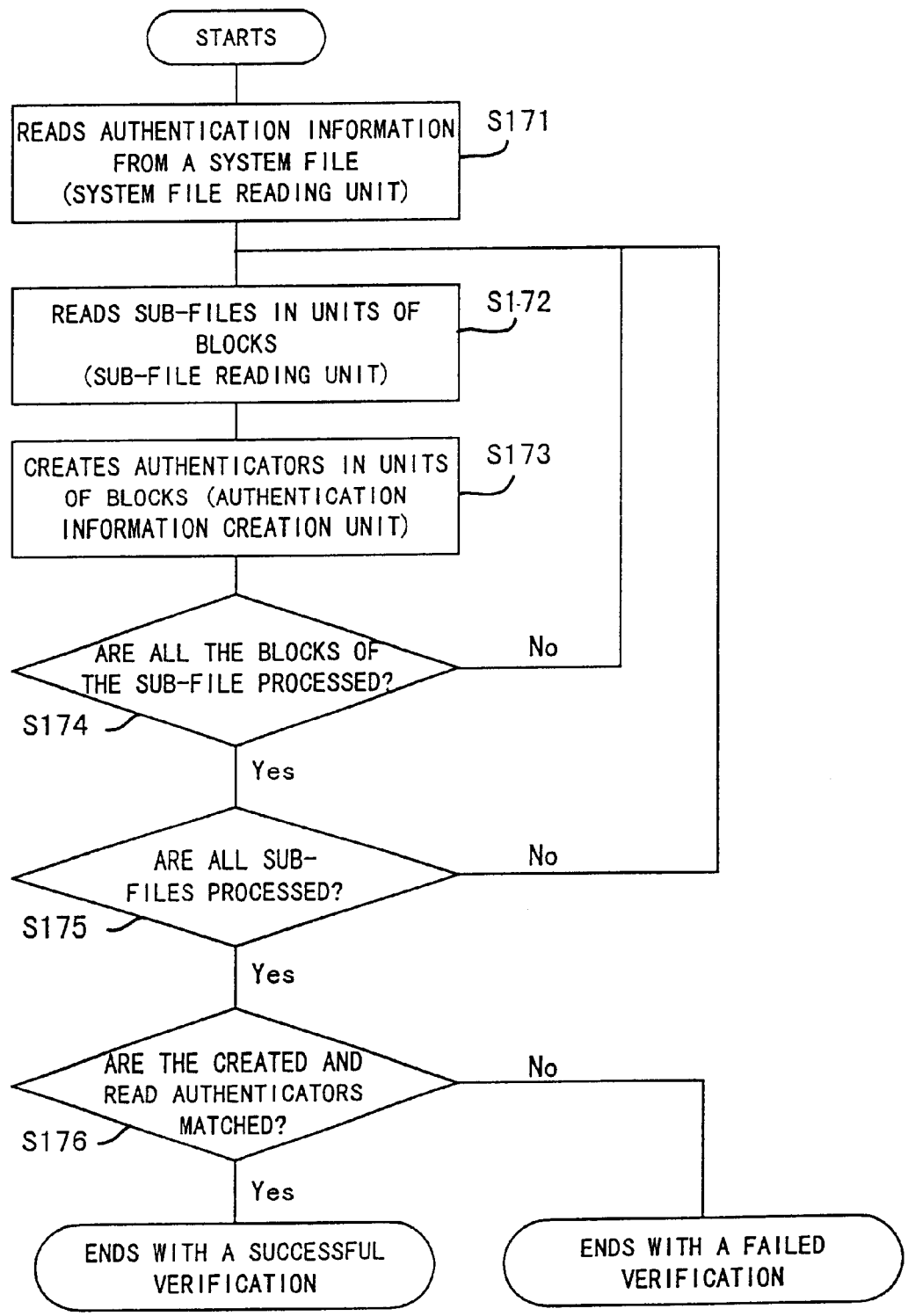
FIG. 17 is a flowchart showing an operation of the eighth embodiment of this invention.

FIG. 16 shows the configuration of the file management system having the alteration preventing/detecting functions of the eighth embodiment of this invention. FIG. 17 is a flowchart showing the operation of the eighth embodiment of this invention.

In step S171, when a verification request is issued by a higher-order layer (a user, etc.) via input/output unit 41, the system file reading unit 135 reads an authenticator being corresponding authentication information from the system file 35, and transfers the authenticator to an authentication information comparison unit 15.

On the other hand, in step S172 the sub-file reading unit 139 reads the sub-files 34 in units of blocks, and transfers the sub-files 34 to the authentication information creation unit 14.

In step S173 the authentication information creation unit 14 creates an authenticator being authentication information, and transfers the authenticator to the authentication information comparison unit 15.

In step S174 it is checked whether or not all the blocks of the sub-file 34 are processed. If there is still another block to be processed, the flow returns to step S172, where the next block of the sub-file 34 is processed.

In step S175 it is checked whether or not all the plurality of sub-files 34 are processed. If there is still another sub-file 34 to be processed, the flow returns to step S172, where the next sub-file 34 is processed.

In step S176 the authentication information comparison unit 15 compares these authenticators being authentication information. If the authenticators are the same, the authentication information comparison unit 15 reports the successful verification to the higher-order layer. If the authenticators are different, the authentication information comparison unit 15 reports the failed verification to the higher-order layer.

FIG. 18 shows the configuration of the file management system having the alteration preventing/detecting functions of the ninth embodiment of this invention. FIG. 19 is a flowchart showing the operation of the ninth embodiment of this invention.

In step S191, when a verification request is issued by a higher-order layer (a user, etc.) via input/output unit 41, the sub-file reading unit 139 reads an authenticator being corresponding authentication information from the specific file 34, and transfers the authenticator to an authentication information comparison unit 15.

On the other hand, in step S192 the main-file reading unit 137 reads a main-file 33 in units of blocks, and transfers the main-file 33 to the authentication information creation unit 14.

In step S193 the authentication information creation unit 14 creates an authenticator being authentication information, and transfers the authenticator to the authentication information comparison unit 15.

In step S194 it is checked whether or not all the blocks of the main-file 33 are processed. If there is still another block to be processed, the flow returns to step S192, where the next block of the main-file 33 is processed.

In step S195 the authentication information comparison unit 15 compares these authenticators being authentication information. If the authenticators are the same, the authentication information comparison unit 15 reports the successful verification to the higher-order layer. If the authenticators are different, the authentication information comparison unit 15 reports the failed verification to the higher-order layer.

Figure 20:
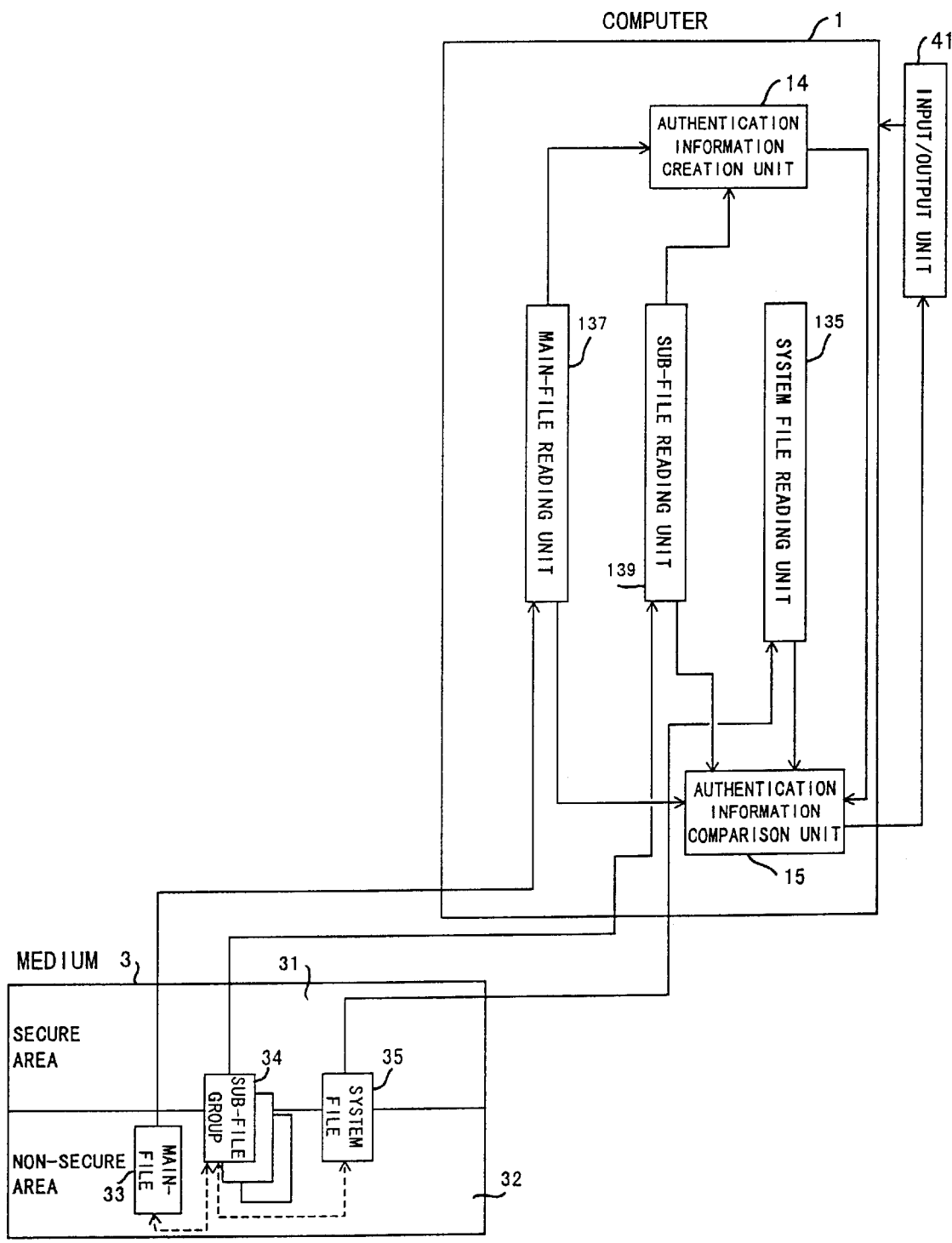
FIG. 20 shows a configuration of a file management system having alteration preventing/detecting functions of the tenth embodiment of this invention.
Figure 21:
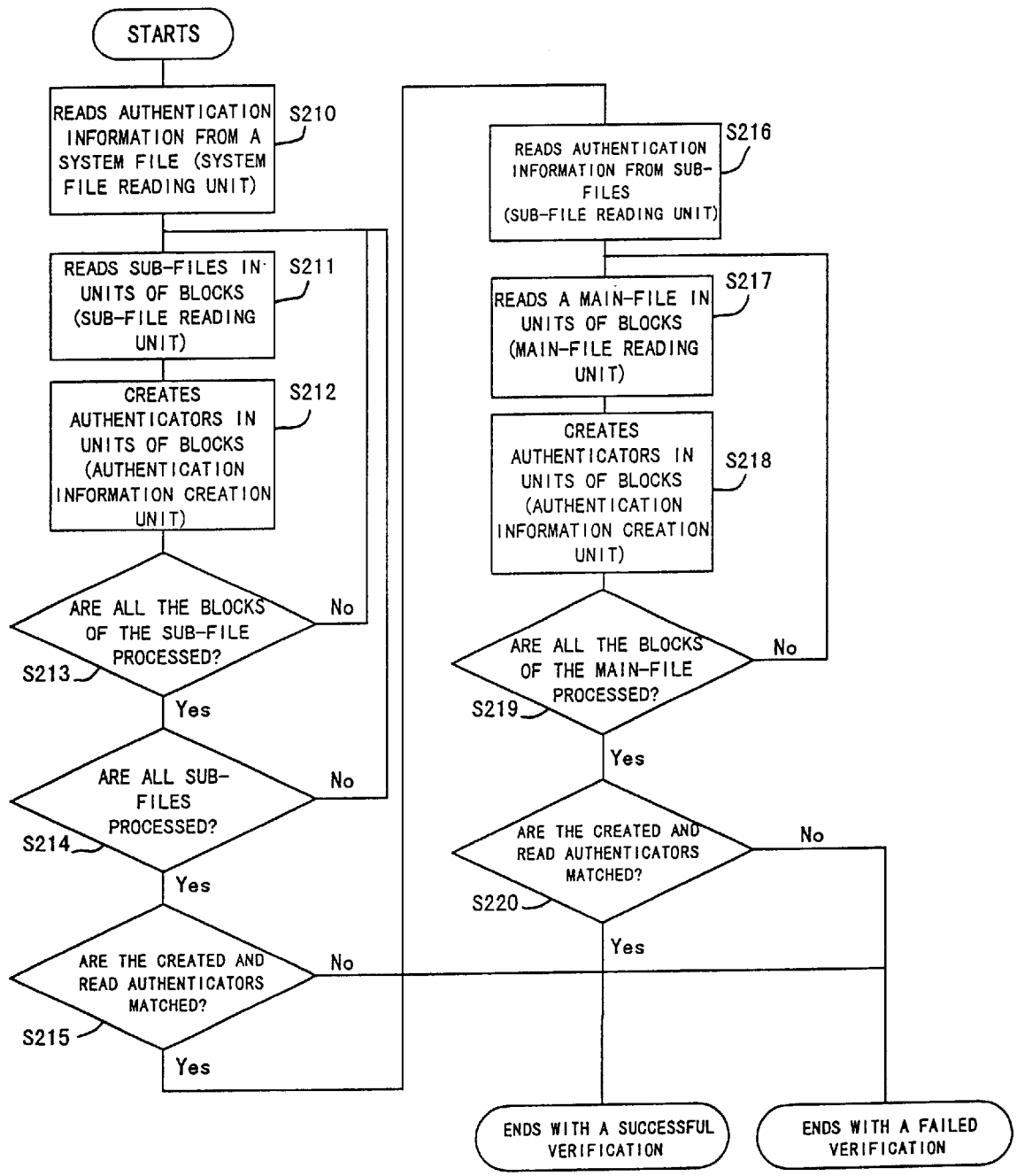
FIG. 21 is a flowchart showing an operation of the tenth embodiment of this invention.

FIG. 20 shows the configuration of the file management system having the alteration preventing/detecting functions of the tenth embodiment of this invention. FIG. 21 is a flowchart showing the operation of the tenth embodiment of this invention.

In step S210, when a reading request for reading a main-file 33 is issued, first the system file reading unit 135 reads an authenticator being corresponding authentication information from the system file 35, and transfers the authenticator to the authentication information comparison unit 15.

On the other hand, in step S211 the sub-file reading unit 139 reads sub-files 34 in units of blocks, and transfers the sub-files to the authentication information creation unit 14.

In step S212 the authentication information creation unit 14 creates an authenticator being authentication information from these sub-files in units of blocks, and transfers the authenticator to the authentication information comparison unit 15.

In step S213 it is checked whether or not all the blocks of the sub-file 34 are processed. If there is still another block to be processed, the flow returns to step S211, where the next block of the sub-file 34 is processed.

In step S214 it is checked whether or not all the plurality of sub-files 34 are processed. If there is still another sub-file 34 to be processed, the flow returns to step S211, where the next sub-file 34 is processed.

In step S215 the authentication information comparison unit 15 compares the authenticator being the read authentication information with the authenticator being created authentication information, and if the authenticators are different, reports the failed verification to the higher-order layer.

Then, if the verification succeeds, in step S216 the sub-file reading unit 139 reads an authenticator being the authentication information for the main-file 33 from the sub-files 34, and transfers the authenticator to the authentication information comparison unit 15.

On the other hand, in step S217 the main-file reading unit 137 reads the main-file 33 in units of blocks, and transfers the main-file 33 to the authentication information creation unit 14.

In step S218 the authentication information creation unit 14 creates an authenticator being authentication information in units of blocks, and transfers the authenticator to the authentication information comparison unit 15.

In step S219 it is checked whether or not all the blocks of the main-file 33 are processed. If there is still another block to be processed, the flow returns to step S217, and the next block of the main-file 33 is processed.

In step S220 the authentication information comparison unit 15 compares the authenticator being read authentication information with the authenticator being created authentication information, and reports the result of the verification to the higher-order layer.

Although the main-file 33 is stored in a non-secure area, the sub-files 34 and system file 35 can be stored in either the secure area or the non-secure area.

Figure 22:
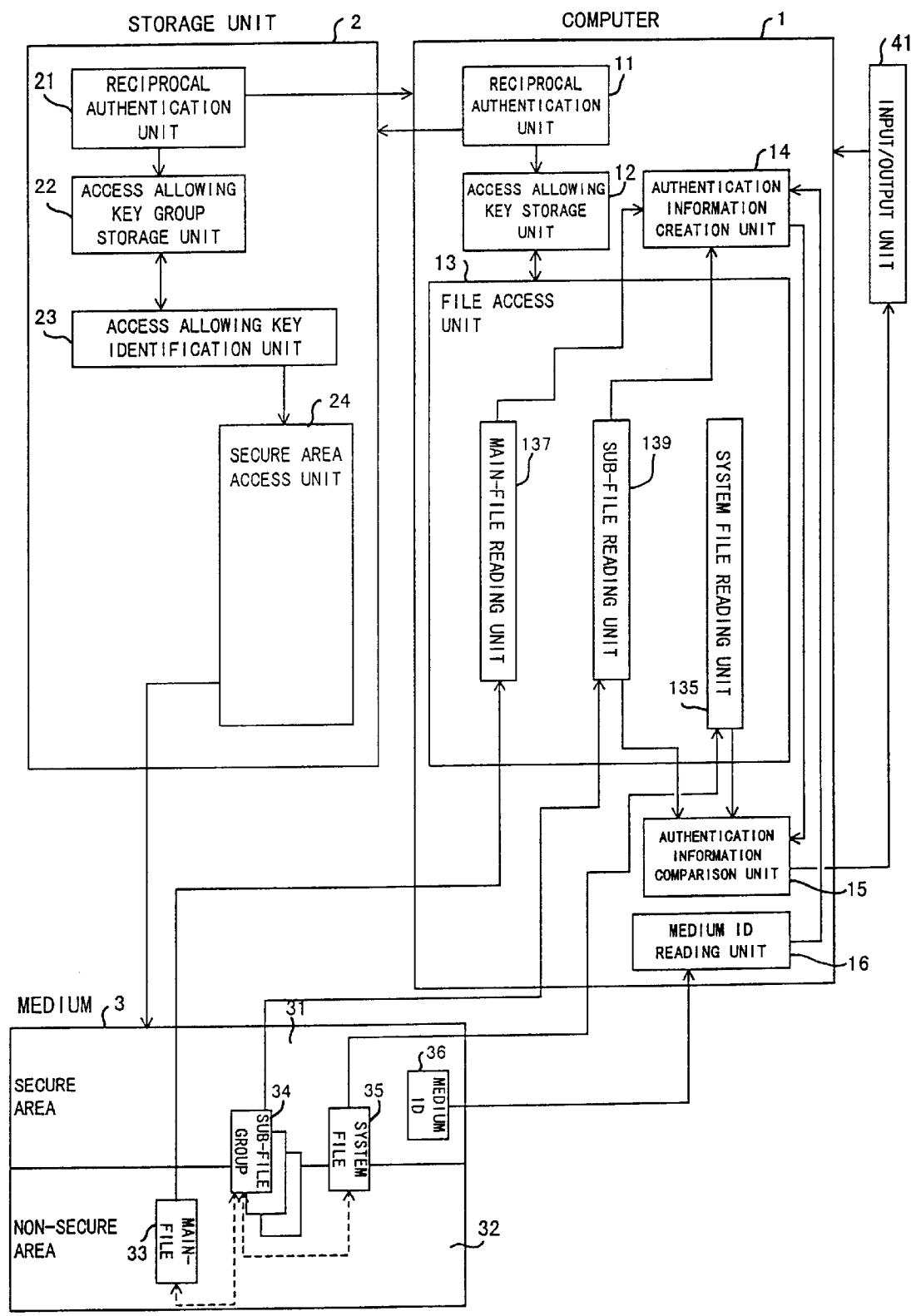
FIG. 22 shows a configuration of a file management system having alteration preventing/detecting functions of the eleventh embodiment of this invention.
Figure 23:
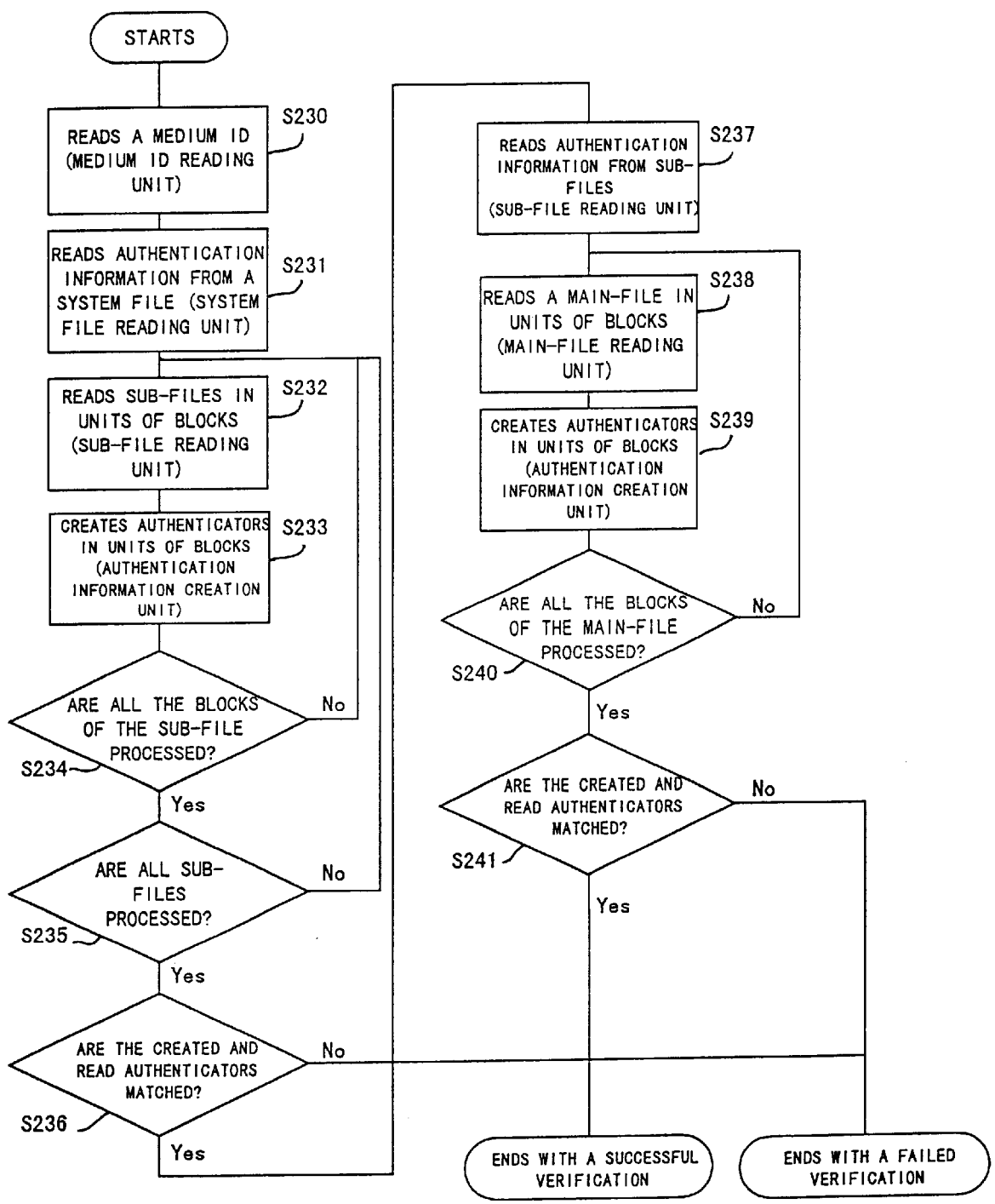
FIG. 23 is a flowchart showing an operation of the eleventh embodiment of this invention.

FIG. 22 shows the configuration of the file management system having the alteration preventing/detecting functions of the eleventh embodiment of this invention. FIG. 23 is a flowchart showing the operation of the eleventh embodiment of this invention.

When a verification request is issued by a higher-order layer (a user, etc.) via the input/output unit 41, in step S230 the medium ID reading unit 16 reads a medium ID 36 from the secure area 31 in the medium 3, and transfers the medium ID 36 to the authentication information creation unit 14.

In step S231 the system file reading unit 135 reads an authenticator being corresponding authentication information from the system file 35, and transfers the authenticator to the authentication information comparison unit 15.

In step S232 the sub-file reading unit 139 reads sub-files 34 in units of blocks, and transfers the sub-files to the authentication information creation unit 14.

In step S233 the authentication information creation unit 14 creates an authenticator being authentication information using the medium ID 36 as a key, and transfers the authenticator to the authentication information comparison unit 15.

In step S234 it is checked whether or not all the blocks of the sub-file 34 are processed. If there is still another block to be processed, the flow returns to step S232, where the next block of the sub-file 34 is processed.

In step S235 it is checked whether or not all the plurality of sub-files 34 are processed. If there is still another sub-file 34 to be processed, the flow returns to step S232, where the next sub-file 34 is processed.

In step S236 the authentication information comparison unit 15 compares the authenticator being the read authentication information with the authenticator being the created authentication information, and reports the failed verification to the higher order layer if the authenticators are not the same.

Then, if the verification succeeds, in step S237 the sub-file reading unit 139 reads an authenticator being authentication information from a specific sub-file 34, and transfers the authenticator to the authentication information comparison unit 15.

In step S238 the main-file reading unit 137 reads a main-file 33 in units of blocks, and transfers the main-file 33 to the authentication information creation unit 14.

In step S239 the authentication information creation unit 14 creates an authenticator being authentication information in units of blocks using the medium ID 36 as a key, and transfers the authenticator to the authentication information comparison unit 15.

In step S240 it is checked whether or not all the blocks of the main-file 33 are processed. If there is still another block to be processed, the flow returns to step S238, and the next block of the main-file 33 is processed.

In step S241 the authentication information comparison unit 15 compares the authenticator being the read authentication information with the authenticator being the created authentication information. If the authenticators are the same, the authentication information comparison unit 15 reports the successful verification to the higher order layer. If the authenticators are different, the authentication information comparison unit 15 reports the failed verification to the higher order layer.

The medium ID 36 to be used as a key when creating an authenticator can also be read from the medium 3 in advance.

Furthermore, the above-mentioned process can be executed for each record composing both the main-file 33 and sub-files 34.

Figure 24:
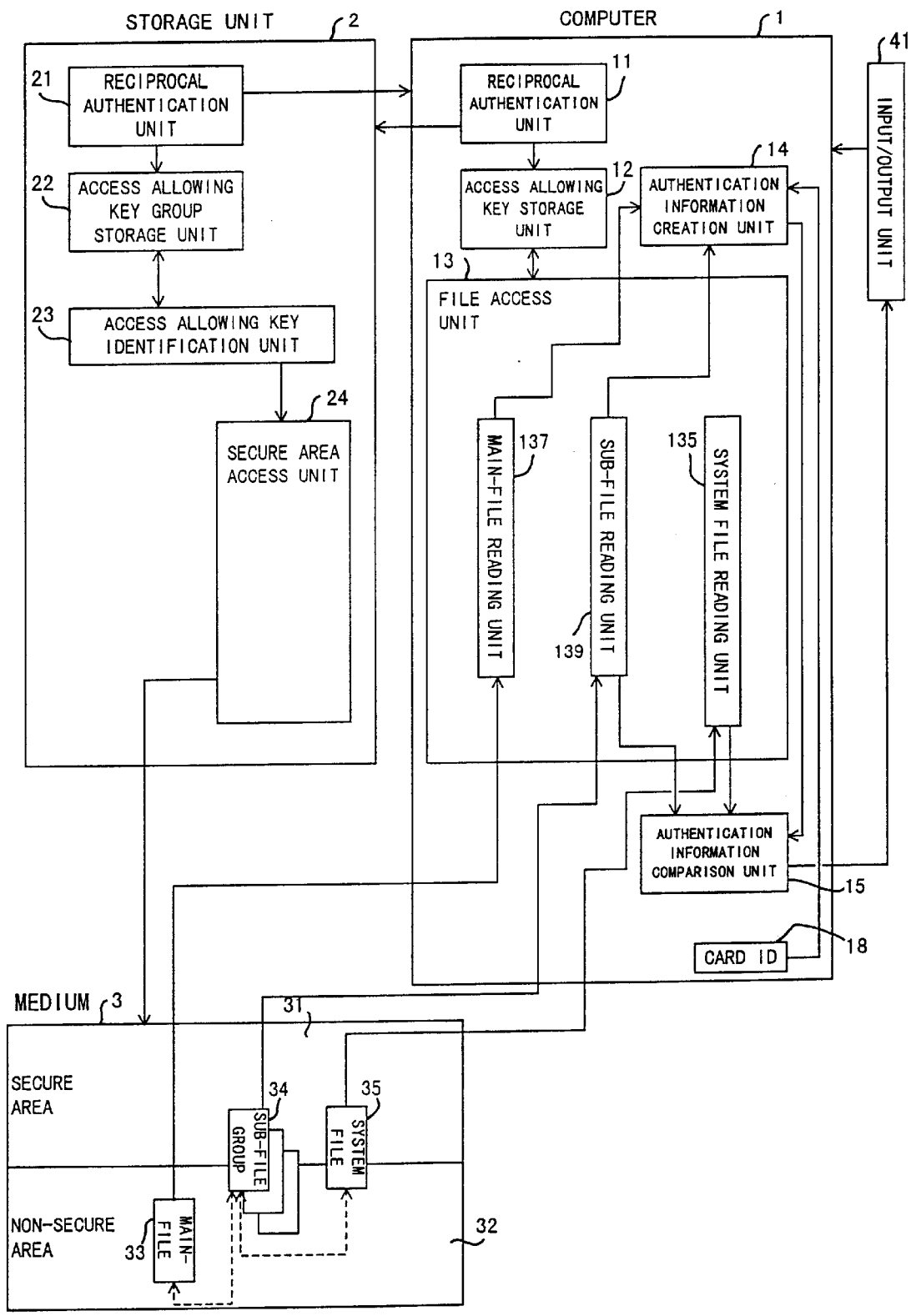
FIG. 24 shows a configuration of a file management system having alteration preventing/detecting functions of the twelfth embodiment of this invention.

FIG. 24 shows the configuration of the file management system having the alteration preventing/detecting functions of the twelfth embodiment of this invention.

The configuration and basic operation of the twelfth embodiment of this invention are the same as the configuration and basic operation of the eleventh embodiment of this invention, except that the medium ID 36 read by the medium ID reading unit 16 in the eleventh embodiment of this invention described with reference to FIG. 22 is replaced with a card ID 18 in the twelfth embodiment of this invention.

Figure 25:
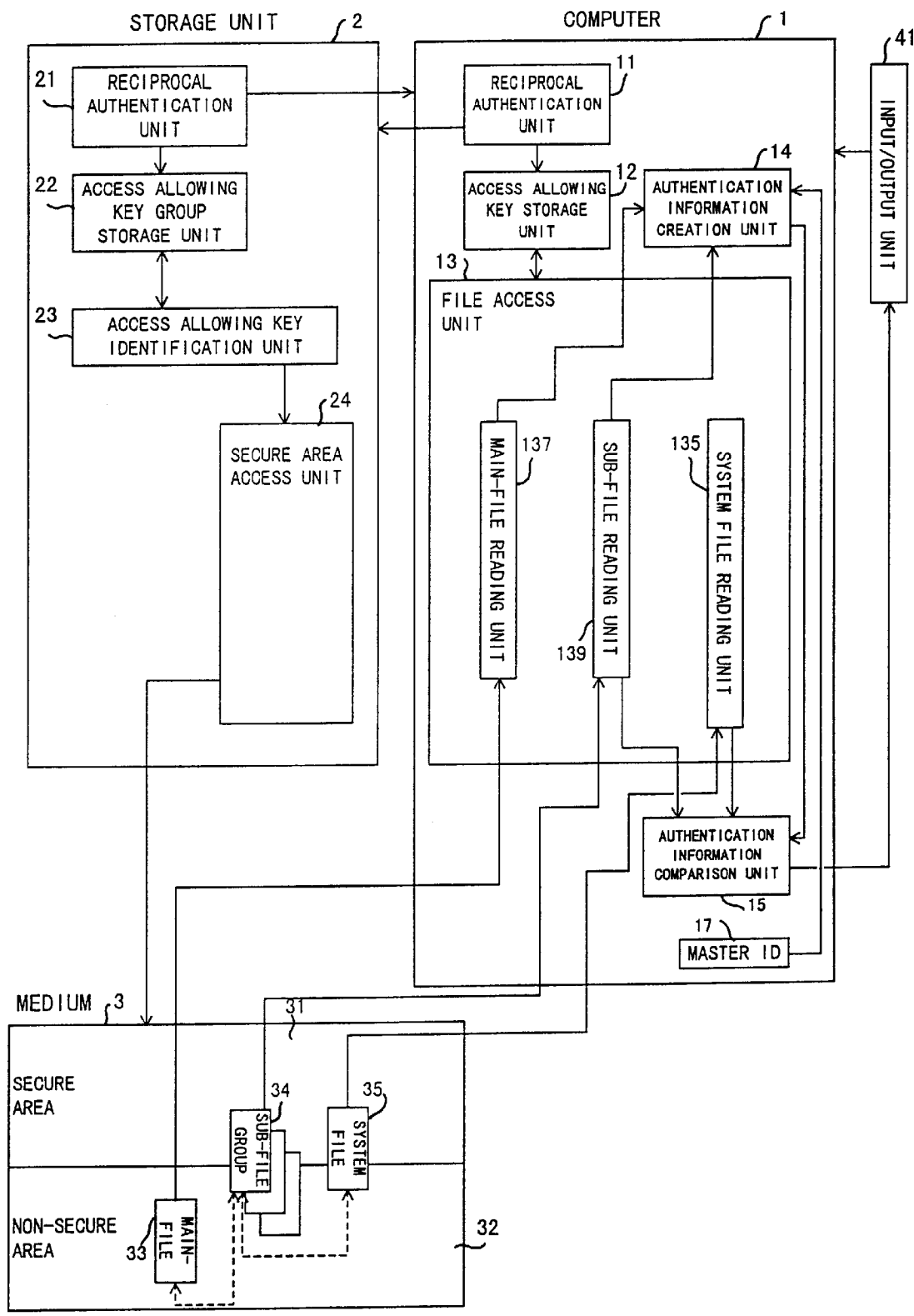
FIG. 25 shows a configuration of a file management system having alteration preventing/detecting functions of the thirteenth embodiment of this invention.

FIG. 25 shows the configuration of the file management system having the alteration preventing/detecting functions of the thirteenth embodiment of this invention.

The configuration and basic operation of the thirteenth embodiment of this invention are the same as the configuration and basic operation of the eleventh embodiment of this invention, except that the medium ID 36 read by the medium ID reading unit 16 in the eleventh embodiment of this invention described with reference to FIG. 22 is replaced with a master ID 17 common to a plurality of pieces of hardware in the twelfth embodiment of this invention.

Figure 26:
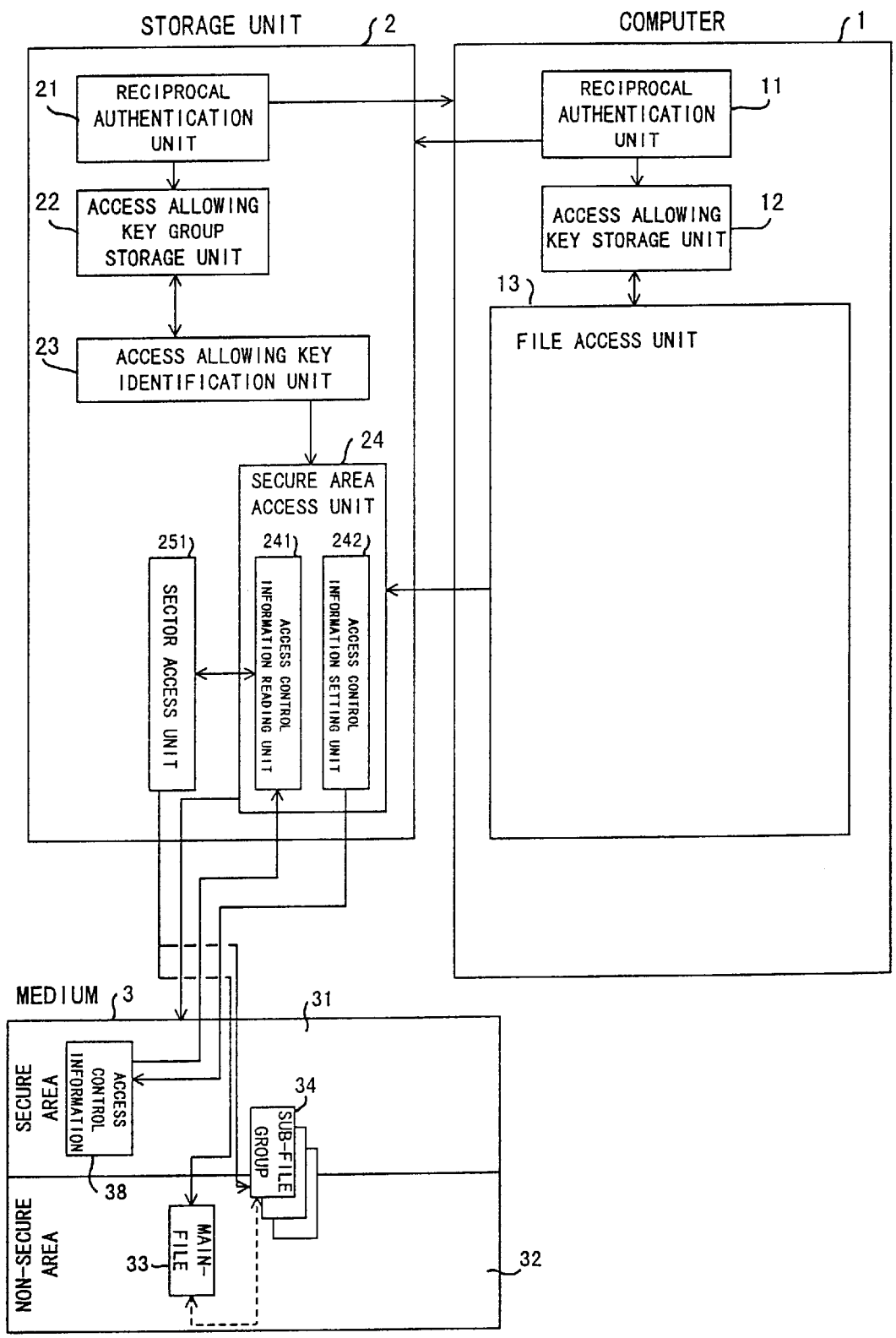
FIG. 26 shows a configuration of a file management system having alteration preventing/detecting functions of the fourteenth embodiment of this invention.
Figure 27:
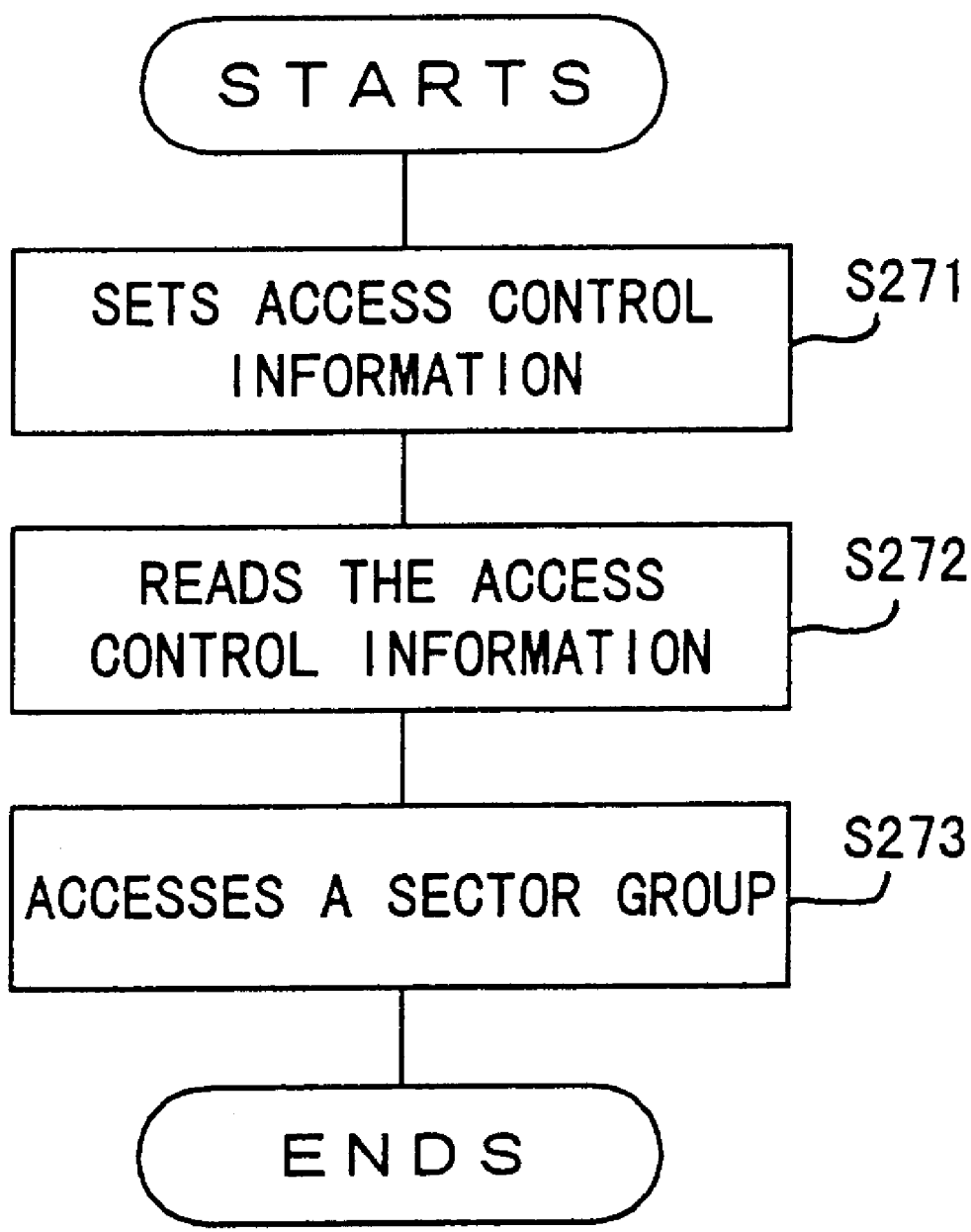
FIG. 27 is a flowchart showing an operation of the fourteenth embodiment of this invention.

FIG. 26 shows the configuration of the file management system having the alteration preventing/detecting functions of the fourteenth embodiment of this invention. FIG. 27 is a flowchart showing the operation of the fourteenth embodiment of this invention.

In step S271 an access control information setting unit 242 sets and updates the setting of access control information 38. Various items are considered as a setting policy at the time of setting, for example, "once set to be unable to write, a sector shall never be set able to write again" can be considered.

In step S272 the access control information reading unit 241 reads the access control information 38 in the secure area 31, and if the access is not allowed, reports the refusal to the user.

If the access is allowed, in step S273 a sector access unit 251 receives an access (reading/writing) request, and accesses a sector (group) composed of the main-file 33 and sub-files 34 in the non-secure area 32 of the storage medium 3.

Figure 28:
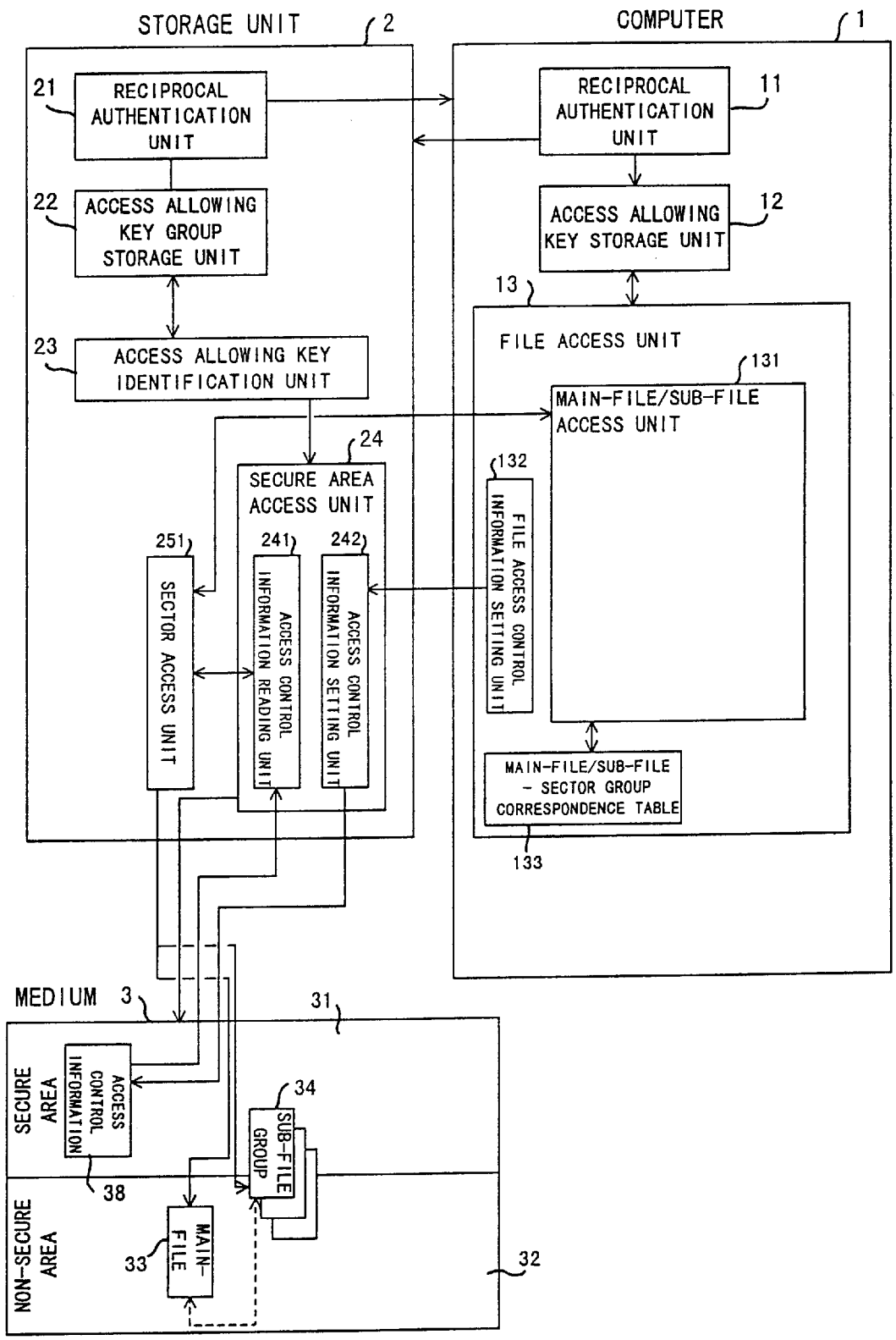
FIG. 28 shows a configuration of a file management system having alteration preventing/detecting functions of the fifteenth embodiment of this invention.
Figure 29:
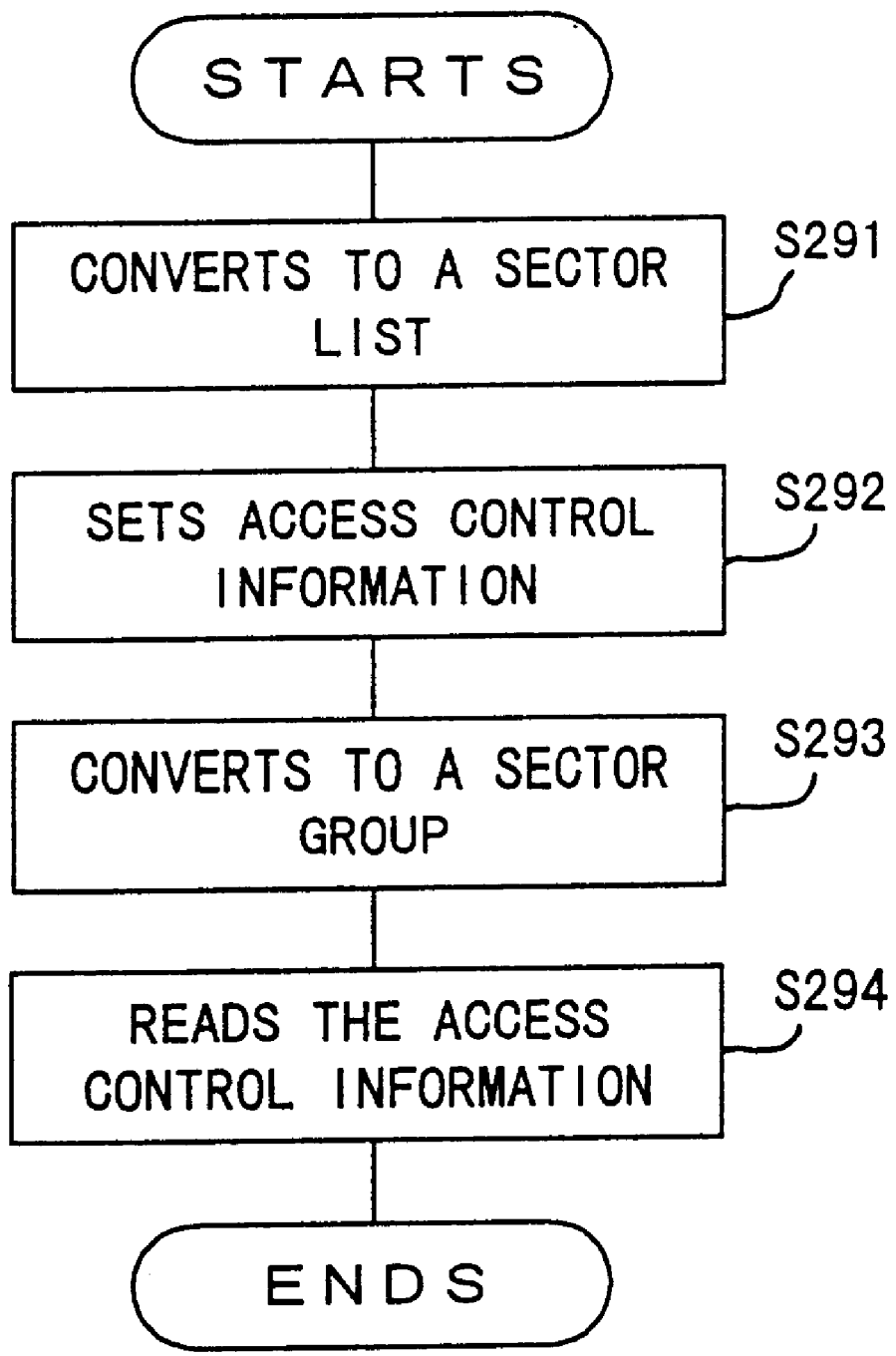
FIG. 29 is a flowchart showing an operation of the fifteenth embodiment of this invention.

FIG. 28 shows the configuration of the file management system having the alteration preventing/detecting functions of the fifteenth embodiment of this invention. FIG. 29 is a flowchart showing the operation of the fifteenth embodiment of this invention.

In step S291 an access control information setting unit 132 converts files designated by a higher-order layer to a sector list using a main-file/sub-file—sector group correspondence table 133, and sends the sector list to the access control information setting unit 242 in the storage unit 2 together with an access mode such as read only/write only/read and write, etc.

In step S292 the access control information setting unit 242 in the storage unit 2 sets and updates the setting of the access control information 38 stored in the medium 3 according to the setting policy. As the setting policy in this case, for example, "once set to be unable to write, a sector shall be never set to be able to write again" is considered.

In step S293 a main-file/sub-file access unit 131 converts both main-file 33 and sub-files 34 to be accessed to a sector (group) according to the main-file/sub-file—sector group correspondence table 133, and issues a request to a sector access unit 251.

In step S294 the sector access unit 251 executes or refuses the sector access according to the access control information 38 read by the access control information reading unit 241.

Figure 30:
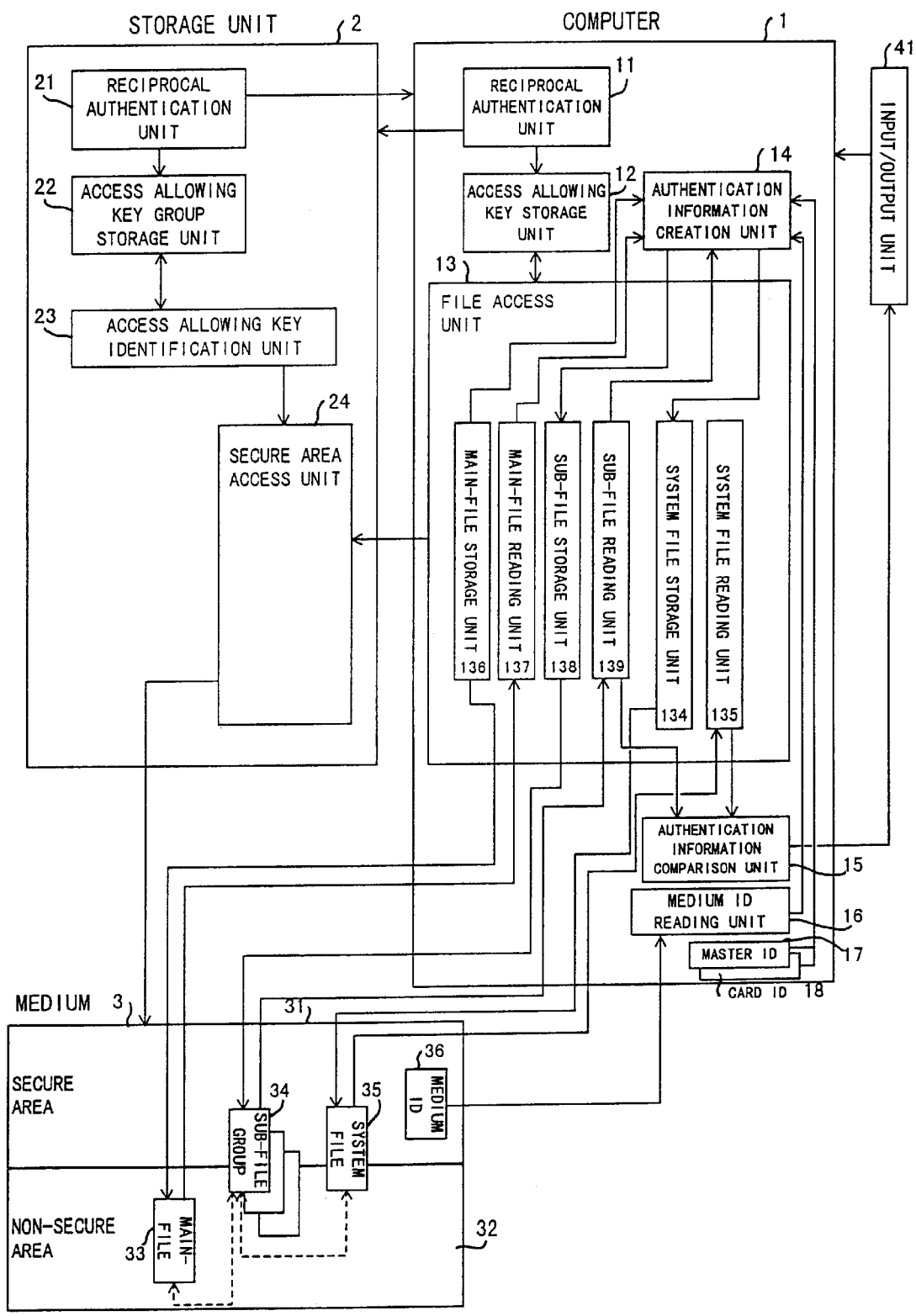
FIG. 30 shows a configuration of a file management system having alteration preventing/detecting functions of the sixteenth embodiment of this invention.

FIG. 30 shows the configuration of the file management system having the alteration preventing/detecting functions of the sixteenth embodiment of this invention.

An arbitrary combination consisting of one, two or all of the medium ID 36, card ID 18 and master ID 17 in the fifth embodiment described with reference to FIG. 12, the sixth embodiment described with reference to FIG. 14, the seventh embodiment described with reference to FIG. 15, the eleventh embodiment described with reference to FIG. 22, the twelfth embodiment described with reference to FIG. 24 and the thirteenth embodiment described with reference to FIG. 25, can also be used.

In this case, for example, it is assumed that information for indicating a lot number is put in a part of the medium ID 36, and the specific lot is made from a material suited for long time preservation or is carefully surface-checked.

Since official documents have to be preserved for a long time, a file system reads the medium ID 36 when inserting a medium, and if the medium is not included in the above-mentioned special lot, reports to the user that the medium cannot be used.

It is needless to say that only if the functions of the present invention are to be executed, the present invention can be applied to a single apparatus, a system or integrated apparatus consisting of a plurality of apparatuses or a system in which the process can be executed via a network such as a LAN, etc.

Figure 31:
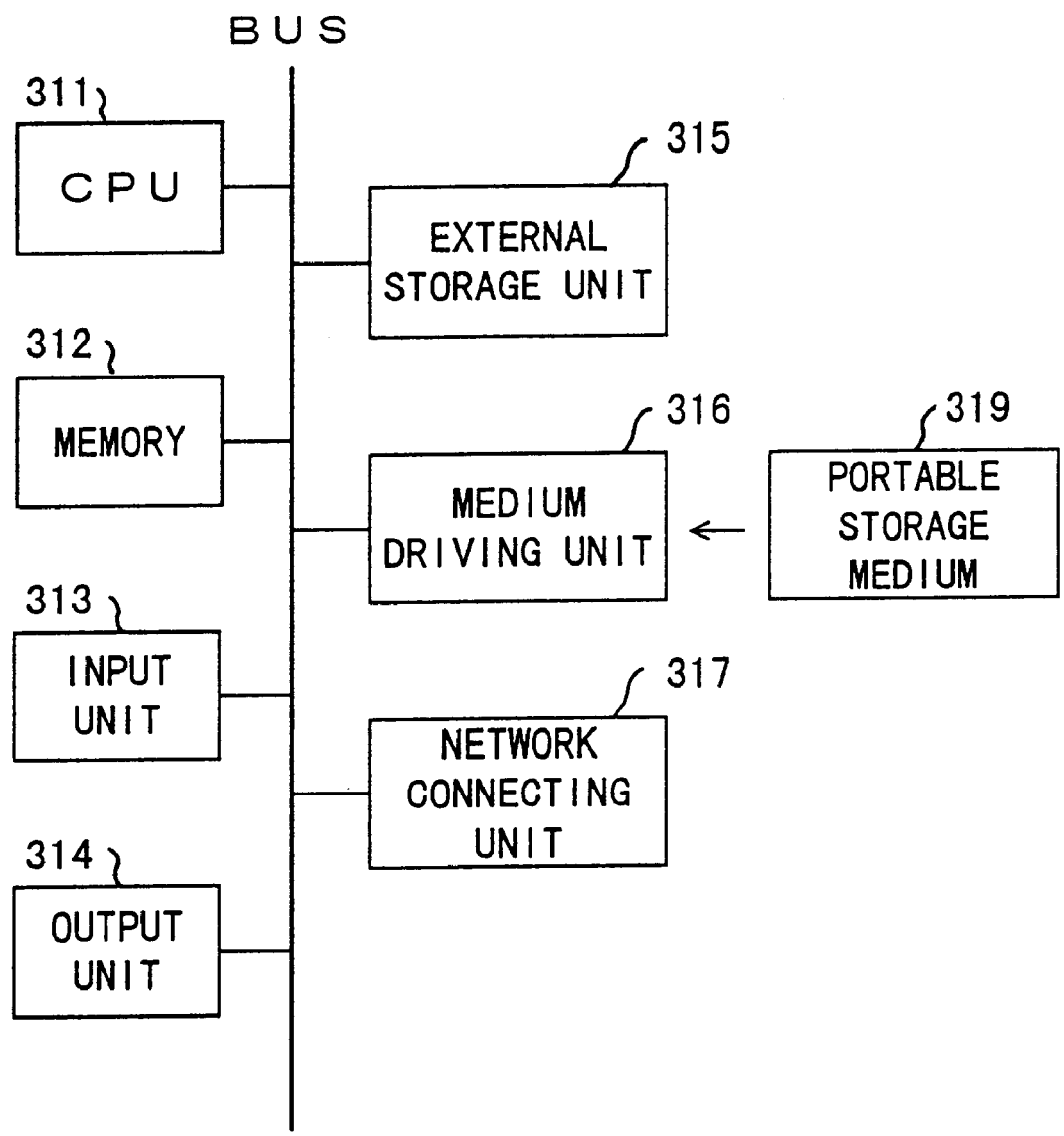
FIG. 31 shows a configuration of an alteration preventing/detecting system.

As shown in FIG. 31 the present invention can be implemented in a system where a CPU 311, a ROM/RAM 312, an input unit 313, an output unit 314, an external storage unit 315, a medium driving unit 316, a portable storage medium 319 and a network connecting unit 317 are connected via a bus. That is, it is needless to say that the functions of the present invention can also be implemented by providing a system or apparatus with a ROM/RAM 312, an external storage unit 315 and a portable storage medium 319, in which software program codes for implementing the system of each above-mentioned embodiments are recorded, and executing the reading of the program codes by the computer (or CPU 311) of the system or apparatus.

In this case, the read program codes themselves implement the new functions of the present invention, and the portable storage medium 319, etc. in which the program codes are recorded only constructs the present invention.

As a portable storage medium 319 for supplying program codes, for example, a floppy disk, a hard disk, a magneto-optic disk, an optical disk, a CD-ROM, a CD-R, a magnetic tape, a nonvolatile memory card, a ROM card, and various kinds of storage media storing the program codes accessed via a network connecting unit 317 (in other words, a communication circuit) such as an electronic mail, personal computer communication, etc. can be used.

By executing the program codes read by a computer, an OS operating in the computer, etc. executes a part or all of the actual process according to the instruction of the program codes, and thereby the functions of the above-mentioned embodiments can be implemented.

Furthermore, after the read program codes are written in a memory provided in a feature expansion board inserted in a computer or a feature expansion unit connected to a computer, a CPU provided in the feature expansion board or unit, etc. executes a part or all of the actual process, and thereby the functions of the above-mentioned embodiments can also be implemented.

As described so far, in the present invention a secure area is usually prevented from being accessed by users by means of, for example, the firmware of a storage unit, and as a result, authenticators, access logs, etc. related to data files cannot be altered.

By locating files and access logs, etc. related to data files in a non-secure area being a normal area and locating only the authenticators of the files in a secure area, the size of the secure area can be reduced.

What is claimed is:

1. A system for managing files comprising a computer and a storage unit, wherein the computer comprises a reciprocal authenticating unit reciprocally authenticating the computer with the storage unit and when the computer and the storage unit are reciprocally authenticated, creating access allowing keys;

an access allowing key storing unit storing the access allowing keys; and a file accessing unit sending an access request together with the access allowing key;

a main-file storing unit storing a main-file;

a sub-file storing unit storing, as a sub-file, authentication information related to the main-file and used to verify the main-file;

an authentication information creating unit creating the main-file authentication information and sub-file authentication information to be used to verify the sub-files; and a system file storing unit storing the sub-file authentication information as a system file, and the storage unit comprises a reciprocal authenticating unit reciprocally authenticating the storage unit with the computer and when the computer and the storage unit are reciprocally authenticated , creating access allowing keys;

an access allowing key group storing unit storing all the access allowing keys;

an access allowing key identification unit identifying if the access allowing key sent from the file accessing unit and stored in the access allowing key storing unit and at least one access allowing key stored in the access allowing key group storing unit, are the same; and a secure area accessing unit accessing a secure area usually unaccessible, wherein the secure area stores a first file which contains authentication information concerning a second file, and the second file is not stored within the secure area, and wherein the authentication information creating unit reads a medium ID peculiar to a medium stored in the secure area, and uses the medium ID to create the main-file authentication information and the sub-file authentication information after the computer and the storage unit are reciprocally authenticated.

2. The system for managing files according to claim 1, wherein the reciprocal authenticating unit provided in said computer and said file accessing unit are implemented by a unit of hardware.

3. The system for managing files according to claim 1, wherein said secure area accessing unit further comprises an access control information reading unit reading access control information stored in said secure area, and said storage unit further comprises a sector accessing unit accessing one of the main-file and sub-files related to the main-file in units of sectors or sector groups according to the access control information.

4. The system for managing files according to claim 3, wherein said secure area accessing unit further comprises an access control information setting unit setting access control information in said secure area.

5. A computer, comprising:

a reciprocal authenticating unit reciprocally authenticating the computer with a storing unit and when the computer and the storage unit are reciprocally authenticated, creating access allowing keys;

an access allowing key storing unit storing the access allowing keys;

a file accessing unit sending an access request together with the access allowing key;

a main-file storing unit storing a main-file;

a sub-file storing unit storing, as a sub-file, authentication information related to the main-file and used to verify the main-file;

an authentication information creating unit creating the main-file authentication information and sub-file authentication information to be used to verify the sub-files; and a system file storing unit storing the sub-file authentication information as a system file.

6. A storage unit, comprising:

a reciprocal authenticating unit reciprocally authenticating the storage unit with a computer and when the computer and the storage unit are reciprocally authenticated, creating access allowing keys;

an access allowing key group storing unit storing all the access allowing keys;

an access allowing key identification unit identifying if the access allowing key stored in the access allowing key storing unit and at least one access allowing key stored in the access allowing key group storing unit, are the same; and a secure area accessing unit accessing a secure area usually unaccessible, wherein the secure area stores a first file which contains authentication information concerning a second file, and the second file is not stored within the secure area, and wherein the authentication information creating unit reads a medium ID peculiar to a medium stored in the secure area, and uses the medium ID to create the main-file authentication information and the sub-file authentication information after the computer and the storage unit are reciprocally authenticated.

7. A method of managing files, comprising:

reciprocally authenticating between a computer and a storage unit and when the computer and the storage unit are reciprocally authenticated, creating an access allowing key;

storing the access allowing key;

storing all the access allowing keys;

storing a main-file;

creating main-file authentication information and sub-file authentication information to be used to verify sub-files;

storing, as a sub-file, authentication information related to the main-file and used to verify the main-file;

storing the sub-file authentication information as a system file;

sending an access request together with the access allowing key;

identifying if the access allowing key stored in the access allowing key storing step and at least one access allowing key stored in the access allowing key group storing step, are the same;

accessing a secure area usually unaccessible, the secure area storing a first file which contains authentication information concerning a second file, and the second file is not stored within the secure area; and reading a medium ID peculiar to the medium stored in the secure area, and using the medium ID to create the main-file authentication information and the sub-file authentication information after the computer and the storage unit are reciprocally authenticated.

8. A method of managing files, comprising:

reciprocally authenticating a computer with a storing unit and when the computer and the storage unit are reciprocally authenticated, creating access allowing keys;

storing the access allowing keys;

storing a main-file;

creating main-file authentication information and sub-file authentication information to be used to verify sub-files;

storing, as a sub-file, authentication information related to the main-file and used to verify the main-file;

storing the sub-file authentication information as a system file;

sending an access request together with the access allowing key;

accessing a secure area usually unaccessible, the secure area storing a first file which contains authentication information concerning a second file, and the second file is not stored within the secure area; and reading a medium ID peculiar to the medium stored in the secure area, and using the medium ID to create the main-file authentication information and the sub-file authentication information after the computer and the storage unit are reciprocally authenticated.

9. A method of managing files, comprising:

reciprocally authenticating a storage unit with a computer and when the computer and the storage unit are authenticated with each other, creating access allowing keys;

storing all the access allowing keys;

identifying if the access allowing key and at least one access allowing key, are the same;

storing a main-file;

creating main-file authentication information and sub-file authentication information to be used to verify sub-files;

storing, as a sub-file, authentication information related to the main-file and used to verify the main-file;

storing the sub-file authentication information as a system file;

accessing a secure area usually unaccessible, the secure area storing a first file which contains authentication information concerning a second file, and the second file is not stored within the secure area; and reading a medium ID peculiar to the medium stored in the secure area, and using the medium ID to create the main-file authentication information and the sub-file authentication information after the computer and the storage unit are reciprocally authenticated.

10. A computer readable storage medium having a recorded file management program for enabling a computer to execute:

reciprocally authenticating between a computer and a storage unit and when the computer and the storage unit are reciprocally authenticated, creating an access allowing key;

storing the access allowing key;

storing all the access allowing keys;

sending an access request together with the access allowing key;

identifying if the access allowing key stored in the access allowing key storing process and at least one access allowing key stored in the access allowing key group storing step, are the same;

storing a main-file;

creating main-file authentication information and sub-file authentication information to be used to verify sub-files;

storing, as a sub-file, authentication information related to the main-file and used to verify the main-file;

storing the sub-file authentication information as a system file;

accessing a secure area usually unaccessible, the secure area storing a first file which contains authentication information concerning a second file, and the second file is not stored within the secure area; and reading a medium ID peculiar to the medium stored in the secure area, and using the medium ID to create the main-file authentication information and the sub-file authentication information after the computer and the storage unit are reciprocally authenticated.

11. A computer readable storage medium having a recorded file management program for enabling a computer to execute:

reciprocally authenticating a computer with a storing unit and when the computer and the storage unit are reciprocally authenticated, creating access allowing keys;

storing the access allowing keys;

sending an access request together with the access allowing key;

storing a main-file;

storing, as a sub-file, authentication information related to the main-file and used to verify the main-file;

creating main-file authentication information and sub-file authentication information to be used to verify sub-files;

storing the sub-file authentication information as a system file;

accessing a secure area usually unaccessible, the secure area storing authentication information concerning a second file, and the second file is not stored within the secure area; and reading a medium ID peculiar to the medium stored in the secure area, and using the medium ID to create the main-file authentication information and the sub-file authentication information after the computer and the storage unit are reciprocally authenticated.

12. A computer readable storage medium having a recorded file management program for enabling a computer to execute:

reciprocally authenticating a computer with a storage unit and when the computer and the storage unit are reciprocally authenticated, creating access allowing keys;

storing the access allowing keys;

identifying if the access allowing key and at least one access allowing key, are the same;

storing a main-file;

storing, as a sub-file, authentication information related to the main-file and used to verify the main-file;

creating main-file authentication information and sub-file authentication information to be used to verify sub-files;

storing the sub-file authentication information as a system file;

accessing a secure area usually unaccessible, the secure area storing authentication information concerning a second file, and the second file is not stored within the secure area; and reading a medium ID peculiar to the medium stored in the secure area, and using the medium ID to create the main-file authentication information and the sub-file authentication information after the computer and the storage unit are reciprocally authenticated.

* * * * *